(12) United States Patent
Morita et al.

(10) Patent No.: US 6,985,178 B1
(45) Date of Patent: Jan. 10, 2006

(54) CAMERA CONTROL SYSTEM, IMAGE PICK-UP SERVER, CLIENT, CONTROL METHOD AND STORAGE MEDIUM THEREFOR

(75) Inventors: Kenji Morita, Yokohama (JP); Tomoaki Kawai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/401,400

(22) Filed: Sep. 22, 1999

(30) Foreign Application Priority Data

Sep. 30, 1998 (JP) .................................. 10-277659
Dec. 28, 1998 (JP) .................................. 10-372270

(51) Int. Cl.
*H04N 5/232* (2006.01)
(52) U.S. Cl. ............................ 348/211.3; 348/207.11
(58) Field of Classification Search ............... 348/143, 348/207.1, 207.11, 211.99, 211.9, 211.14, 348/211.6, 211.3
See application file for complete search history.

(56) References Cited

U.S. PATENT DOCUMENTS

| | | | |
|---|---|---|---|
| 5,808,670 A * | 9/1998 | Oyashiki et al. ............ 348/143 |
| 6,055,014 A * | 4/2000 | Hosonuma et al. ......... 348/143 |
| 6,208,379 B1 * | 3/2001 | Oya et al. .................... 348/143 |
| 6,529,234 B2 * | 3/2003 | Urisaka et al. ......... 348/211.99 |
| 6,670,991 B1 * | 12/2003 | Takagi et al. ............... 382/205 |
| 6,768,563 B1 * | 7/2004 | Murata et al. .............. 358/450 |

* cited by examiner

*Primary Examiner*—Aung Moe
*Assistant Examiner*—Jason Whipkey
(74) *Attorney, Agent, or Firm*—Morgan & Finnegan, L.L.P.

(57) ABSTRACT

Provided is a camera control system which will not invade one's privacy even if a camera is located where there is a problem in terms of privacy. To accomplish this, the system is provided with an input unit for inputting a control command for controlling shooting direction or zoom magnification of the camera, a calculation unit for calculating, on the basis of the control command input by the input unit, an area to be imaged by the camera, a limiting unit for limiting a control range of the zoom magnification of the camera in a case where the imaging area of the camera calculated by the calculation unit overlaps a prescribed area; and a control unit for controlling the zoom magnification of the camera so as to fall within the control range, which has been limited by the limiting unit, in a case where the zoom magnification of the camera exceeds the control range limited by the limiting unit.

24 Claims, 21 Drawing Sheets

F I G. 1
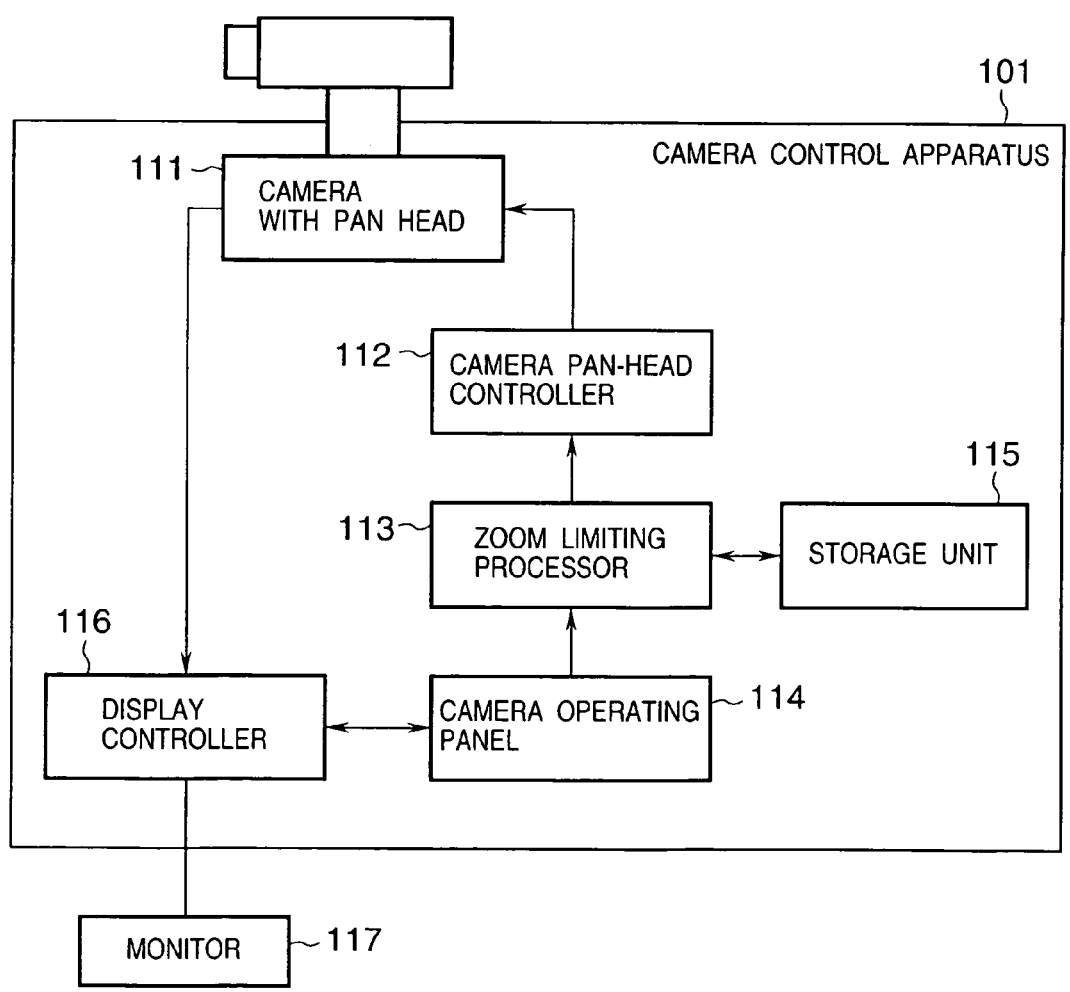

FIG. 2

| LIMITED AREA | x | y | MAXIMUM ALLOWABLE ZOOM MAGNIFICATION |
|---|---|---|---|
| 202 | 1.5 ~ 3.5 | -1 ~ -3 | 2.0 |
| 203 | -5.5 ~ -1.5 | 2 ~ 4 | 1.5 |
| . | . | . | . |
| . | . | . | . |
| . | . | . | . |

FIG. 19

| VIRTUAL-CAMERA ID NO. | PAN LIMIT (LEFT) | PAN LIMIT (RIGHT) | TILT LIMIT (UP) | TILT LIMIT (DOWN) | ZOOM LIMIT (UPPER) | ZOOM LIMIT (LOWER) |
|---|---|---|---|---|---|---|
| 1 | -90 | -30 | 30 | 0 | 8 | 1 |
| 3 | 10 | 20 | -10 | 10 | 8 | 4 |
| 2 | -50 | -10 | 0 | -20 | 2 | 1 |
| | | | | | | |

CAMERA CONTROL SYSTEM, IMAGE PICK-UP SERVER, CLIENT, CONTROL METHOD AND STORAGE MEDIUM THEREFOR

BACKGROUND OF THE INVENTION

This invention relates to a camera control system, which is capable of controlling a remote camera, ideal for application to surveillance cameras, etc.

A camera control system for controlling the shooting direction and zoom magnification of a remote camera via a network has already been proposed by the assignee of the present applicant.

However, there is the danger that an imaging area in which problems arise in terms of privacy may fall within the field of view of the camera. The camera cannot be installed at such a location for this reason.

SUMMARY OF THE INVENTION

Accordingly, an object of the present invention is to provide a camera control system which will not invade one's privacy even at a location where there is a problem in terms of privacy.

According to the present invention, the foregoing object is attained by providing a camera control apparatus for controlling shooting direction and zoom magnification of a camera, comprising: input means for inputting a control command for controlling shooting direction or zoom magnification of the camera; calculation means for calculating, on the basis of the control command input by the input means, an area to be imaged by the camera; limiting means for limiting a control range of the zoom magnification of the camera in a case where the imaging area of the camera calculated by the calculation means overlaps a prescribed area; and control means for controlling the zoom magnification of the camera so as to fall within the control range, which has been limited by the limiting means, in a case where the zoom magnification of the camera exceeds the control range limited by the limiting means.

In accordance with the present invention, the camera control apparatus further comprises storage means for storing limit information, which concerns the control range of the zoom magnification of the camera, corresponding to the prescribed area.

In accordance with the present invention, the limiting means limits an upper limit of the zoom magnification of the camera in such a manner that the upper limit of the zoom magnification of the camera will be lower than in a case where the imaging area of the camera does not overlap the prescribed area.

In accordance with the present invention, the control means controls the zoom magnification of the camera to the upper limit of the control range, which has been limited by the limiting means, in a case where the zoom magnification of the camera has exceeded the upper limit of the control range limited by the limiting means.

In accordance with the present invention, there is provided a camera control system for controlling shooting direction and zoom magnification of a camera from an operation terminal via a network, wherein the operation terminal comprises: input means for inputting a control command for controlling shooting direction or zoom magnification of the camera, and output means for outputting the control command, which has been input by the input means, to a camera control apparatus that controls the camera; and the camera control apparatus comprises: calculation means for calculating, on the basis of the control command output by the operation terminal, an area to be imaged by the camera; limiting means for limiting a control range of the zoom magnification of the camera in a case where the imaging area of the camera calculated by the calculation means overlaps a prescribed area; and control means for controlling the zoom magnification of the camera so as to fall within the control range, which has been limited by the limiting means, in a case where the zoom magnification of the camera exceeds the control range limited by the limiting means.

In accordance with the present invention, the camera control apparatus further comprises storage means for storing limit information concerning the control range of the zoom magnification of the camera corresponding to the prescribed area.

In accordance with the present invention, the limiting means limits an upper limit of the zoom magnification of the camera.

In accordance with the present invention, the control means controls the zoom magnification to the upper limit of the control range, which has been limited by the limiting means, in a case where the zoom magnification of the camera has exceeded the upper limit of the control range limited by the limiting means.

The present invention further provides a camera control method for controlling shooting direction and zoom magnification of a camera, comprising: an input step of inputting a control command for controlling shooting direction or zoom magnification of the camera; a calculation step of calculating, on the basis of the control command input by the input step, an area to be imaged by the camera; a limiting step of limiting a control range of the zoom magnification of the camera in a case where the imaging area of the camera calculated by the calculation step overlaps a prescribed area; and a control step of controlling the zoom magnification of the camera so as to fall within the control range, which has been limited by the limiting step, in a case where the zoom magnification of the camera exceeds the control range limited by the limiting step.

In accordance with the present invention, the camera control method further comprises a storage step of storing limit information concerning the control range of the zoom magnification of the camera corresponding to the prescribed area.

In accordance with the present invention, the limiting step limits an upper limit of the zoom magnification of the camera.

In accordance with the present invention, the control step controls the zoom magnification of the camera to the upper limit of the control range, which has been limited by the limiting step, in a case where the zoom magnification of the camera has exceeded the upper limit of the control range limited by the limiting step.

A storage medium storing a camera control program for controlling shooting direction and zoom magnification of a camera, wherein the stored program calculates, on the basis of a control command for controlling shooting direction or zoom magnification of the camera, an area to be imaged by the camera; limits a control range of the zoom magnification of the camera in a case where the calculated imaging area of the camera overlaps a prescribed area; and controls the zoom magnification of the camera so as to fall within the limited control range in a case where the limited control range is exceeded.

In accordance with the present invention, the stored control program further stores limit information concerning the control range of the zoom magnification of the camera corresponding to the prescribed area.

In accordance with the present invention, the stored control program further limits an upper limit of the zoom magnification of the camera.

In accordance with the present invention, the stored control program further controls the zoom magnification of the camera to the upper limit of the control range in a case where the upper limit of the limited control range is exceeded.

In accordance with the present invention, there is provided a camera control apparatus for controlling zoom magnification of a camera, comprising: input means for inputting a control command for controlling zoom magnification of the camera; calculation means for calculating, on the basis of the control command input by the input means, an area to be imaged by the camera; limiting means for limiting a control range of the zoom magnification of the camera in a case where the imaging area of the camera calculated by the calculation means overlaps a prescribed area; and control means for controlling the zoom magnification of the camera so as to fall within the control range, which has been limited by the limiting means, in a case where the zoom magnification of the camera exceeds the control range limited by the limiting means.

The present invention further provides a camera control method for controlling zoom magnification of a camera, comprising: an input step of inputting a control command for controlling zoom magnification of the camera; a calculation step of calculating, on the basis of the control command input by the input step, an area to be imaged by the camera; a limiting step of limiting a control range of the zoom magnification of the camera in a case where the imaging area of the camera calculated by the calculation step overlaps a prescribed area; and a control step of controlling the zoom magnification of the camera so as to fall within the control range, which has been limited by the limiting step, in a case where the zoom magnification of the camera exceeds the control range limited by the limiting step.

In accordance with the present invention, the network is a LAN or ISDN line.

Another object of the present invention is to provide an image pick-up server, a client, a control method and a storage medium therefor, in which it is possible to provide an excellent operating environment, without giving a client an odd impression, while setting a plurality of scattered imaging control areas within a range in which imaging can be performed by image sensing means whose shooting direction can be changed.

According to the present invention, there is provided an image pick-up server, which has image sensing means, for performing a distribution service which distributes video information obtained by the image sensing means to a client via a network, comprising: storage means for setting a plurality of shootable areas, which are the object of the distribution service, within a range in which shooting direction of the image sensing means can be changed, and storing information relating to the plurality of shootable areas set and information which specifies a plurality of virtual image sensing means for respective ones of the shootable areas; and control means for reading out, from the storage means, information corresponding to virtual image sensing means selectively designated by the client, setting a range in which it is possible to change the shooting direction of the image sensing means based upon the information relating to the shootable area indicated by the information that has been read out, and controlling the image sensing means within the range in which it is possible to change the shooting direction.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a block diagram of a camera control apparatus according to an embodiment of the present invention;

FIG. 2 is a diagram showing an example of a look-up table serving as zoom limiting information;

FIG. 19 is a diagram showing the structure of a camera-control limits list according to the second embodiment;

DESCRIPTION OF THE PREFERRED EMBODIMENTS

Figure 3:
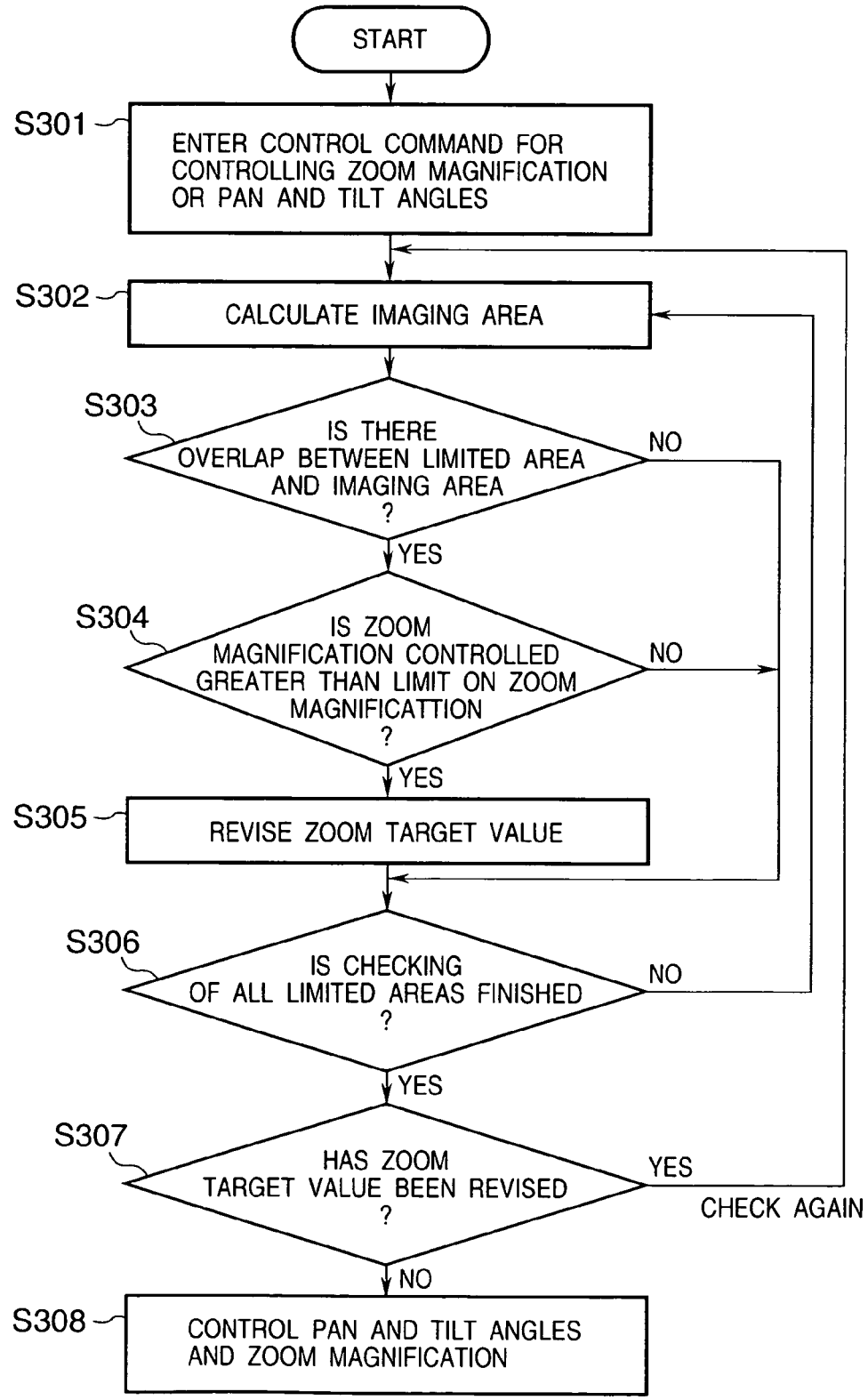
FIG. 3 is a processing flowchart illustrating the operation of the embodiment.

Embodiments of the present invention will now be described with reference to the drawings.

First Embodiment

FIG. 1 is a block diagram showing a camera control apparatus 101 according to this embodiment. A camera 111 equipped with a pan head is panned and tilted by controlling the pan head, thereby controlling the shooting direction of the camera. The camera 111 is equipped with a zoom lens the imaging angle of view of which can be changed. The image picked up by the camera 111 is output to a display controller 116. The latter executes predetermined signal processing and then displays the captured image on a monitor 117. The monitor 117 is constituted by a bitmap display or the like.

A camera operating panel 114, which comprises a mouse or keyboard (not shown), etc., is capable of inputting commands for controlling panning tilting and zooming of the camera 111. A zoom limiting processor 113 determines whether to limit zoom magnification in dependence upon the pan, tilt and zoom control commands entered from the camera operating panel 114. A storage unit 115, which comprises a RAM or the like, stores a look-up table serving as zoom limiting information, which is shown in FIG. 2. The look-up table is composed of the following for each limited area: x coordinates (coordinates in the pan direction), y coordinates (coordinates in the tilt direction) and the maximum allowable zoom ratio for the area. The coordinates of the center of a range in which the panning and tilting of the camera 111 can be changed is assumed to be (0,0).

The zoom limiting processor 113 decides limiting of zoom magnification based upon the look-up table shown in FIG. 2. A camera pan-head controller 112 controls panning tilting and zooming of the camera 111 based upon the commands input from the camera operating panel 114 for controlling panning tilting and zooming of the camera 111, and a zoom limiting command from the zoom limiting processor 113. In this embodiment, the camera pan-head controller 112 and zoom limiting processor 113 may be implemented by processing executed by the same microprocessor, such as a CPU.

FIG. 3 is a flowchart of processing illustrating operation of this embodiment. FIGS. 4 through 7 are conceptual views showing an example of the relationship between the imaging area of the camera 111 and areas in which imaging is to be limited. An area 201 indicates the maximum control range over which imaging is possible by panning and tilting a camera. Numerals 202 and 203 denote areas in which zoom magnification is to be limited. As illustrated also in FIG. 2, the limitations on zoom magnification are such that the magnifications are 2.0× and 1.5×in areas 202 and 203, respectively. An area 204 indicates an imaging range calculated at a step S302, described later. It should be noted that if zoom magnification is not limited, then the zoom magnification of the camera 111 is capable of being controlled up to a maximum of 10×.

First, at step S301 in FIG. 3, a command for controlling the zoom magnification of the camera 111 or commands for controlling panning and tilting of the camera 111 are input from the camera operating panel 114. Control then proceeds to step S302, at which an area in which imaging is be performed by the camera 111 is calculated in advance by the zoom limiting processor 113 based upon the entered commands.

Figure 4:
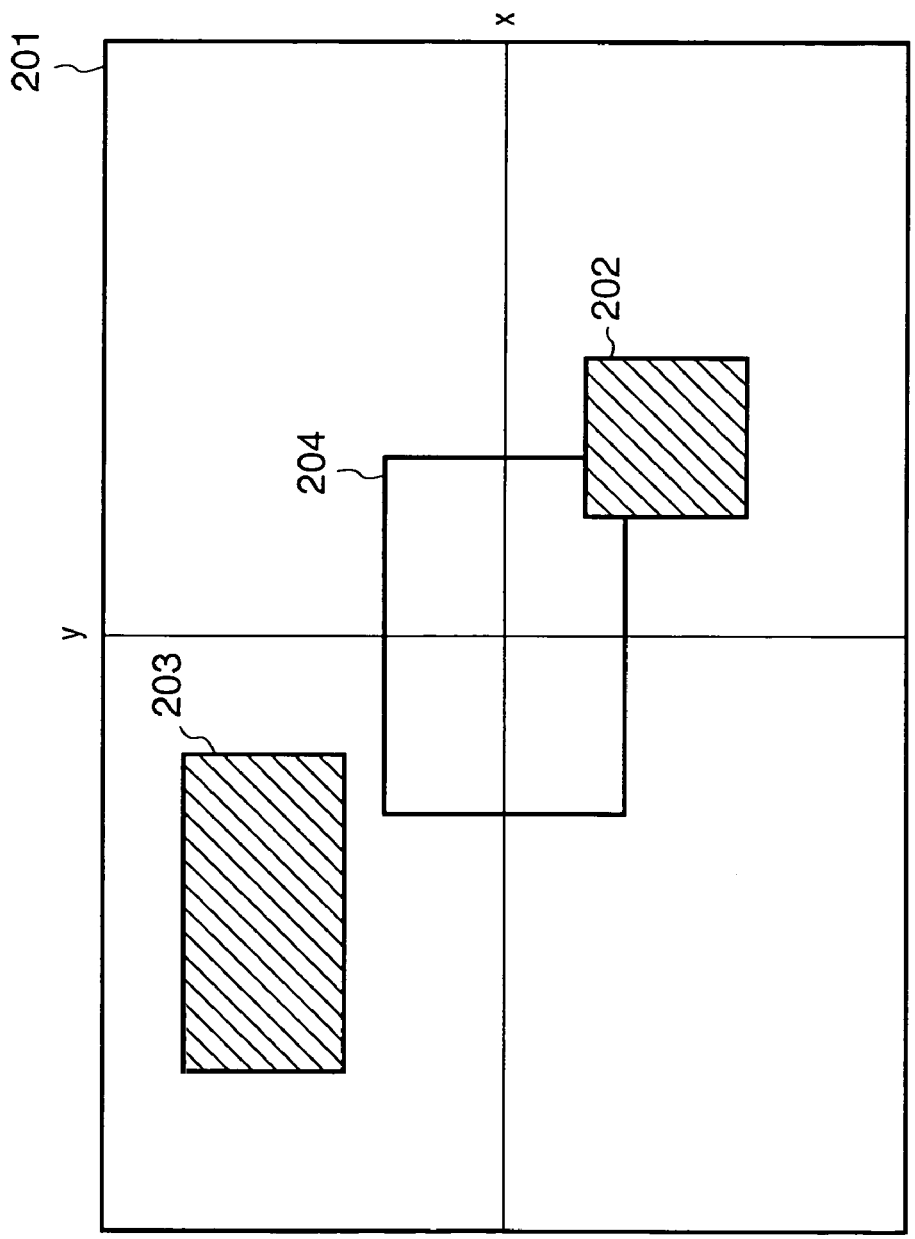
FIG. 4 is a conceptual view showing an example of the relationship between the imaging area of a camera and areas in which zoom magnification is to be limited.

If it is found at step S303 that the imaging area 204 calculated beforehand overlaps the area 202 limited to the zoom magnification shown in the look-up table of FIG. 2, control proceeds to step S304. FIG. 4 illustrates an example of the relationship between the calculated imaging area and the limited areas at this time. If the calculated area does not overlap the areas of limited zoom magnification, control proceeds to step S306.

Figure 5:
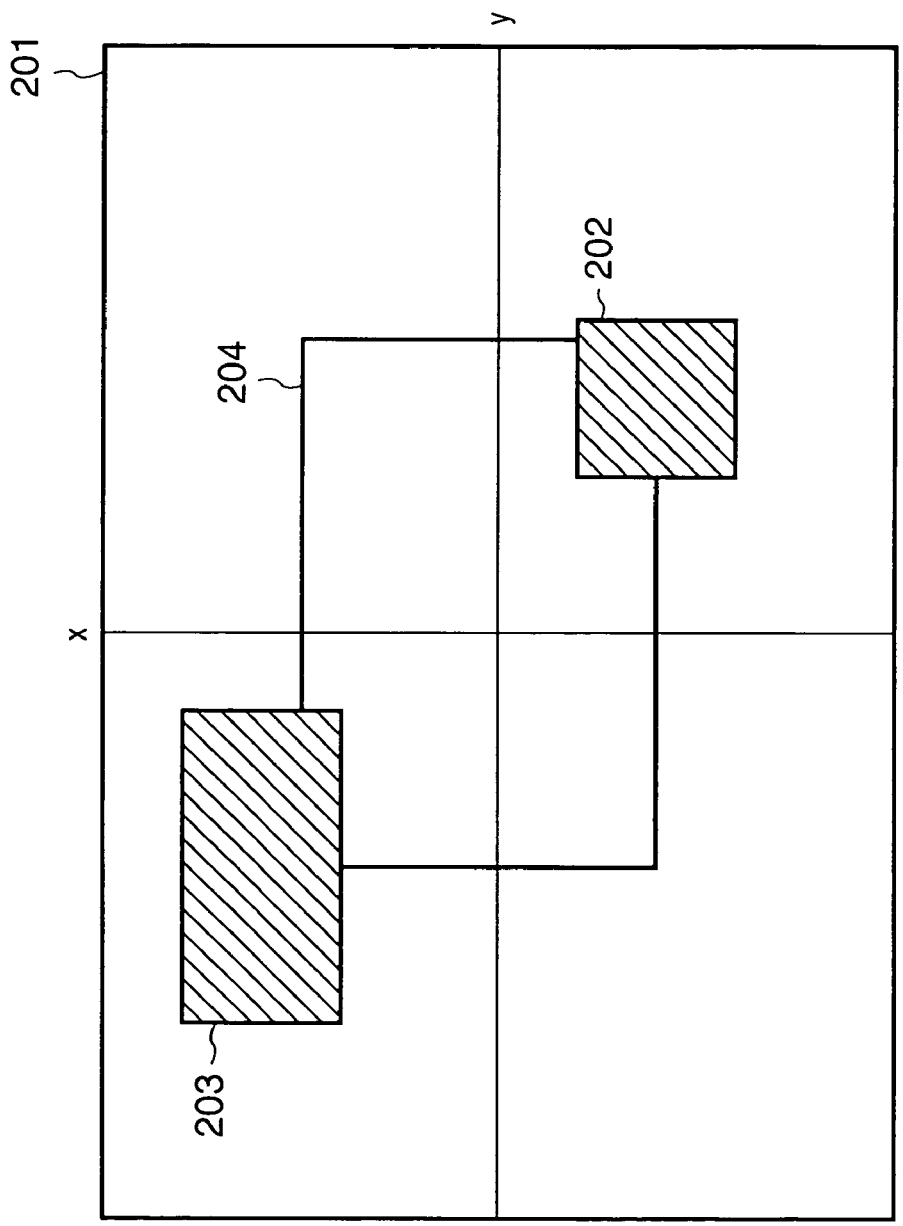
FIG. 5 is a conceptual view showing an example of the relationship between the imaging area of a camera and areas in which zoom magnification is to be limited.
Figure 6:
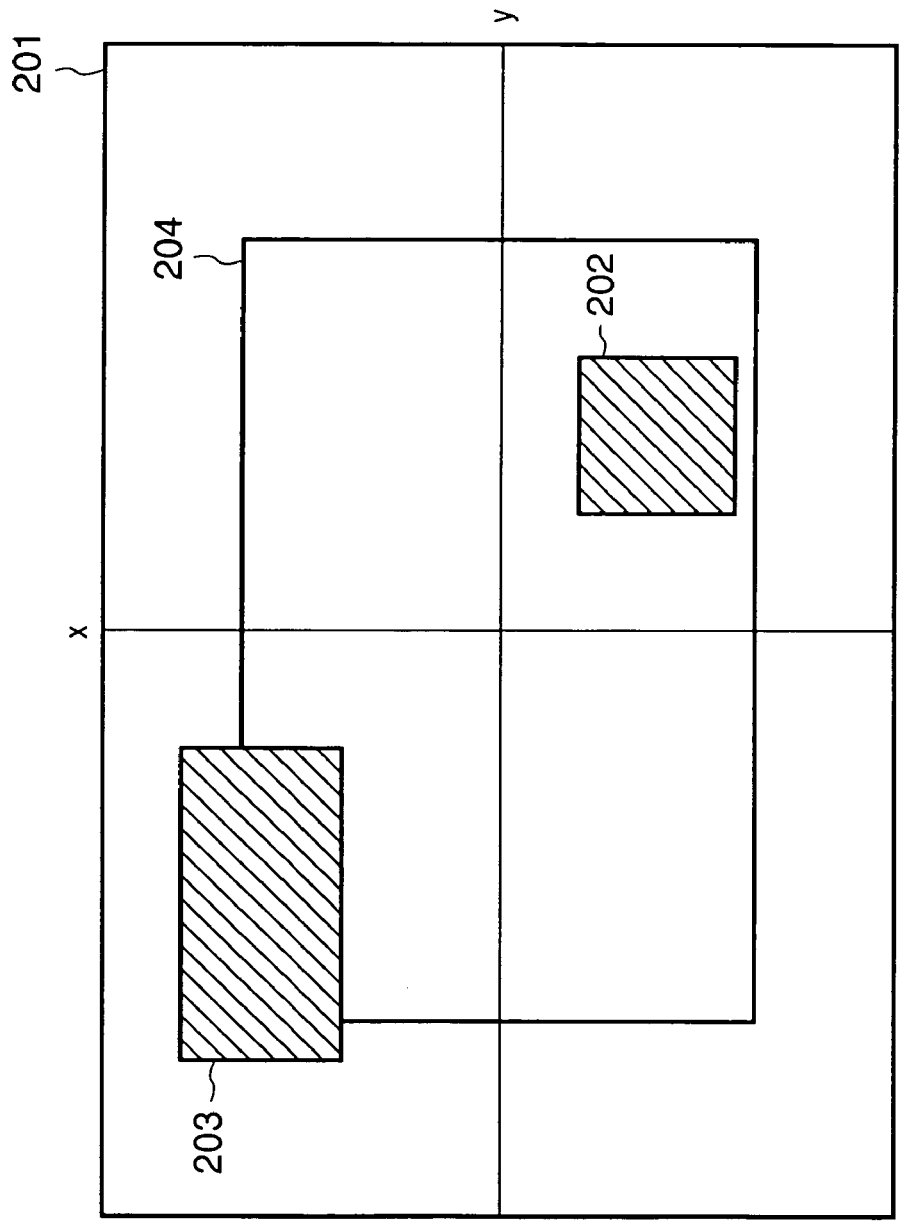
FIG. 6 is a conceptual view showing an example of the relationship between the imaging area of a camera and areas in which zoom magnification is to be limited.
Figure 7:
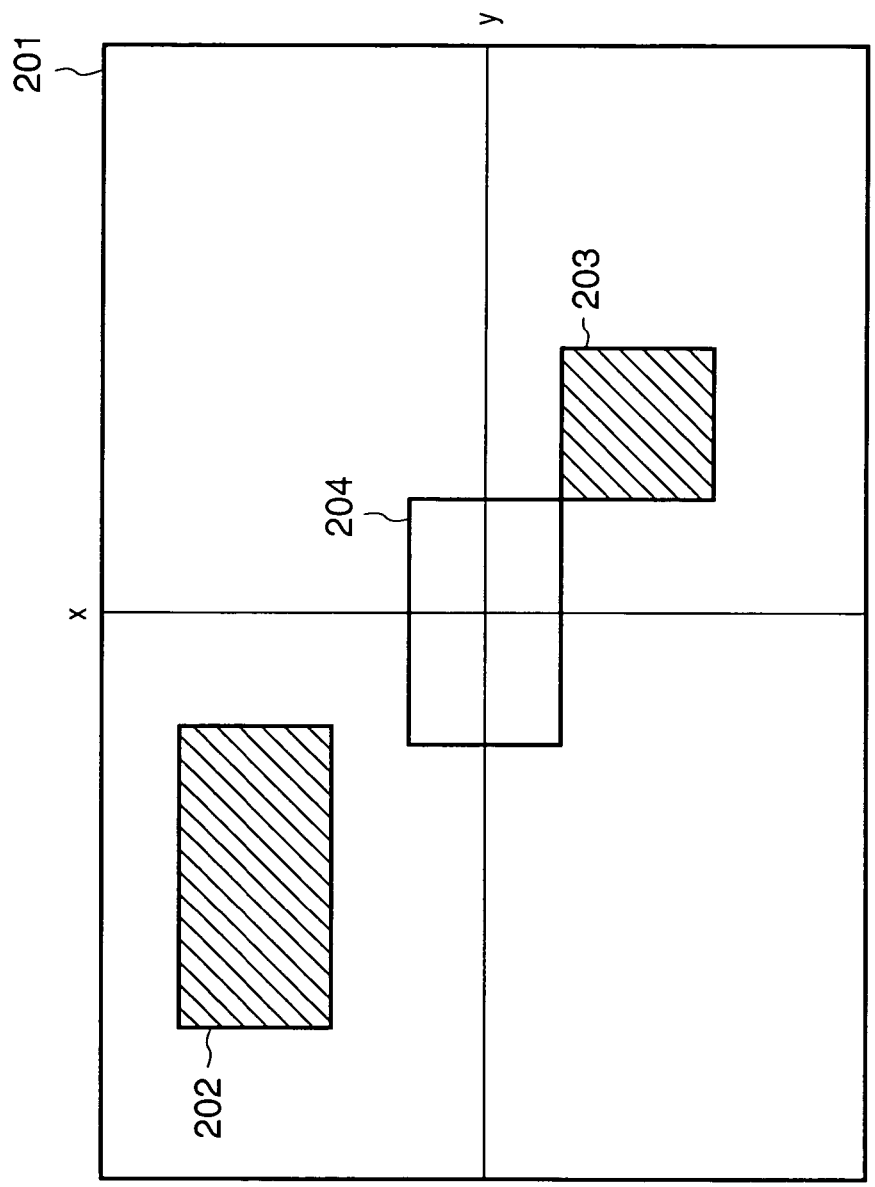
FIG. 7 is a conceptual view showing an example of the relationship between the imaging area of a camera and areas in which zoom magnification is to be limited.

It is determined at step S304 whether a requested zoom magnification is greater than the maximum allowable zoom magnification (2.0×) of the limited area 202. If the requested zoom magnification exceeds the limit on the zoom magnification set for the limited area 202, control proceeds to step S305. Here the camera pan-head controller 112 revises the control target of zoom magnification of camera 111 from the usual controllable zoom magnification (10×) to the maximum allowable zoom magnification (2.0×) of limited area 202. On the other hand, if it is found at step S304 that controlled zoom magnification does not exceed the limit on zoom magnification (in which case the relationship between the imaging area and the limited area at this time will be as shown in FIG. 7), then control proceeds to step S306. If the check regarding the area 202 of limited zoom magnification is finished, then, in order to check the area 203 of limited zoom magnification, the processing of steps S303 to S305 is executed. By way of example, if the calculated imaging area 204 and the limited area 203 overlap, as shown in FIG. 5, owing to revision of the control target of zoom magnification to 2.0× by the above-described processing, then the revised zoom magnification exceeds the maximum allowable zoom magnification of limited area 203. Consequently, the control target of zoom magnification is revised again, becoming 1.5×. The relationship between the imaging area and the limited areas in this case is as shown in FIG. 6.

If the checking of all areas of limited zoom magnification present in the look-up table is completed, control proceeds to step S307.

If it is found at step S307 that the control target of zoom magnification has been revised, control returns to step S302 so that all limited areas in the look-up table are checked again through steps S302 to S306. If it is determined by this recheck that the revision of the zoom magnification is correct, control proceeds to step S308, where a control signal for controlling the camera 111 to the revised zoom magnification is output to the camera pan-head controller 112. On the basis of this control signal, the camera pan-head controller 112 drives the zoom lens of the camera 111 and, on the basis of pan and tilt control commands from the camera operating panel 114, controls panning and tilting to move the shooting direction.

In accordance with this embodiment, as described above, controlling the panning and tilting of the camera 111 provides a limit on zoom magnification in an area, in which privacy is a concern, located in the range capable of being shot by the camera. An area in which imaging will take place is calculated beforehand based upon a control command input by the camera operating panel 114. If overlap occurs between the calculated imaging area and an area in which zoom magnification is limited, reference is had to the allowable zoom magnification of the limited area and a limitation is imposed upon zoom control in such a manner that the upper limit of zoom magnification is lowered below that which prevails when there is no overlap. As a result, it is possible to control imaging by the camera, even at locations where privacy is a concern, without infringing upon such privacy. Since the maximum allowable zoom magnification can be made different for each limited area, an apparatus can be provided that makes it possible to deal flexibly with limited areas having a high degree of importance.

In the embodiment described above, the zoom magnification is limited if overlap occurs between the imaging area calculated by the zoom limiting processor 113 and the area in which zoom magnification is to be limited. However, an arrangement may be adopted in which zoom magnification is limited in a case where the position of the center of a calculated imaging field of view falls within the area in which zoom magnification is to be limited.

Figure 8:
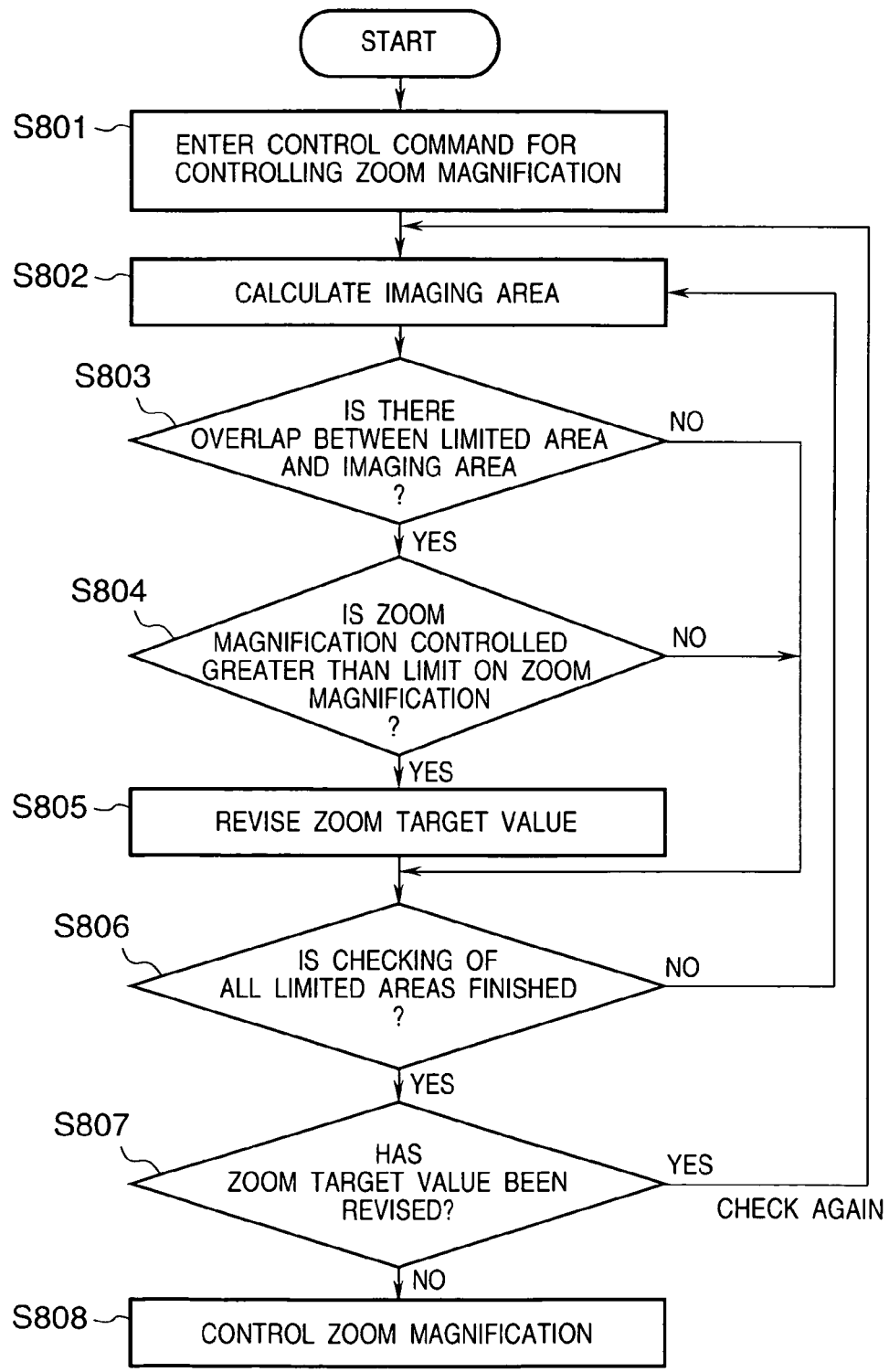
FIG. 8 is a flowchart illustrating the operation of the embodiment.

FIG. 8 shows a similar process to FIG. 3. At step S801, control command is entered for controlling zoom magnification and imaging area is calculated at step S802. At step S803, it is determined that whether there is overlap between limited area and imaging area. If it is determined at step S803 that there is overlap, the process proceeds to step S804 where it is determined that whether the controlled zoom magnification is greater than limit on zoom magnification. If it is determined at step S804 that the controlled zoom magnification is greater than limit, the process proceeds to step S805 where zoom target value is revised. If it is determined at step S803 that there is no overlap, the process advances to step S806. Also, if it is determined at step S804 that the controlled zoom magnification is not greater than limit, the process advances to step S806. At step S806, it is determined that whether checking of all limited areas is finished. If it is determined at step S806 that the checking is finished at step S806, the process proceeds to step S807 where it is determined that whether zoom target value has been revised. If it is determined at step S806 that the checking is not finished, the process goes back to step S802. If it is determined at step S807 that the zoom target value has not been revised, zoom magnification is controlled at step S808. If it is determined at step S807 that the zoom target value has been revised, the process goes back to step S802.

Figure 9:
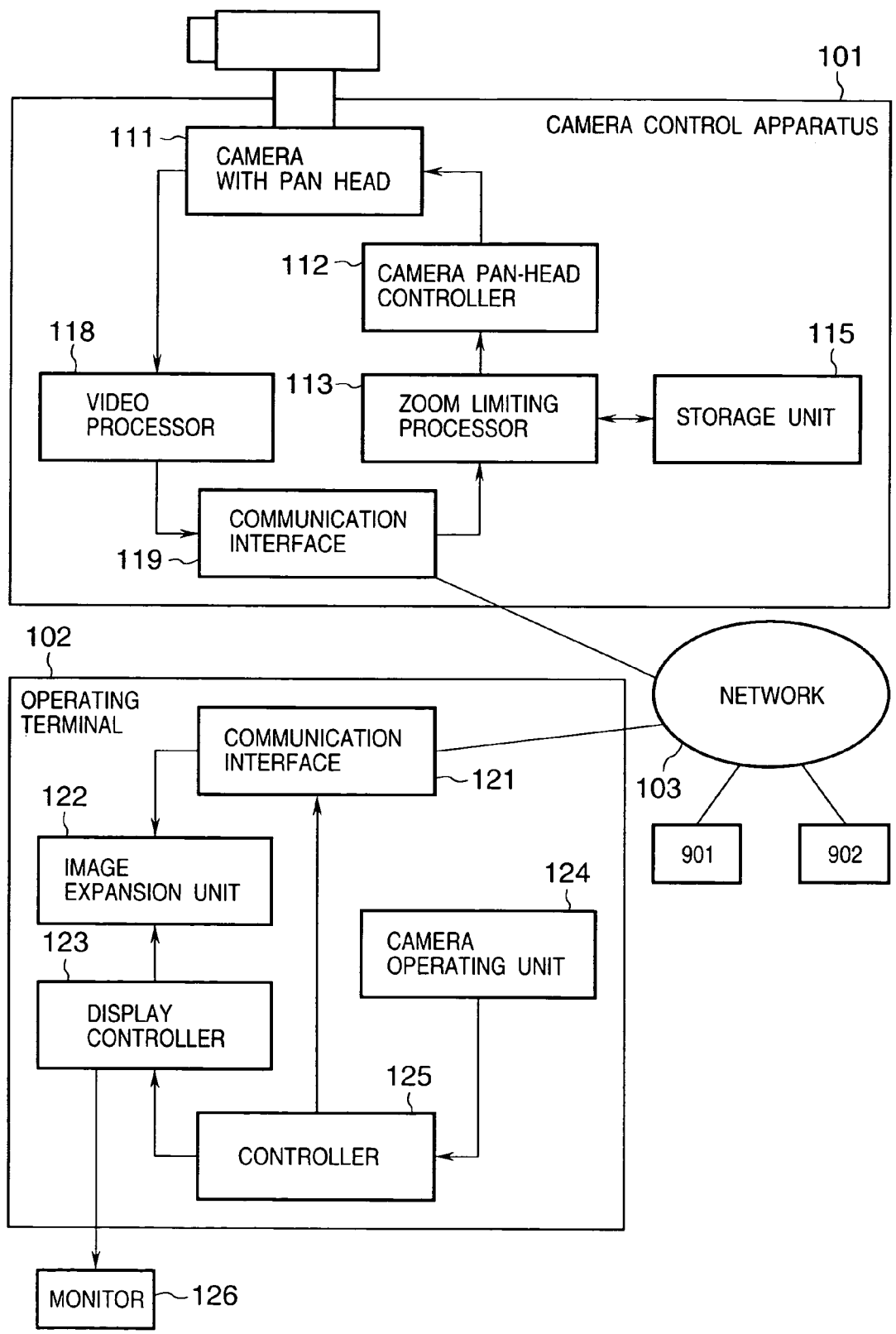
FIG. 9 is a block diagram of a camera control system according to this embodiment of the present invention.

Further, as shown in FIG. 9, this embodiment can be applied to a camera control system in which it is possible to control the camera control apparatus 101 from a remote operating terminal 102 via a network 103 such as a LAN (Local Area Network) or ISDN (Integrated Services Digital Network) line. A plurality of camera control apparatuses 101, 901 and operating terminals 102, 902 can be connected on the network 103 so that a desired camera control apparatus 101 can be controlled from any control terminals 102, 902. Blocks shown in FIG. 9 that are identical with those of FIG. 1 are designated by like reference characters and need not be described again.

The operating terminal 102 includes a controller 125 for controlling the overall operating terminal 102, and a camera operating unit 124, which comprises a mouse and keyboard, for controlling panning, tilting and zooming of the camera 111. A control command that has been entered by the camera operating unit 124 is output to the camera control apparatus 101 via a communication interface 121. The camera control apparatus 101 has a communication interface 119 for receiving pan, tilt and zoom camera control signals output by the operating terminal 102 and outputting these signals to the zoom limiting processor 113, and the zoom limiting processor 113 executes processing similar to that described above. The camera control apparatus 101 further includes a video processor 118 for applying compression processing to an image signal picked up by the camera 111, converting the signal to a signal conforming to the network specifications, and outputting the signal from the communication interface 119 to the operating terminal 102. The operating terminal 102 further includes an image expansion unit 122 for expanding image data received at the communication interface 121, and a display controller 123 for executing prescribed signal processing and causing a monitor 126 to display a sensed image.

The above-described embodiment uses a camera, which is equipped with a pan head, the shooting direction of which can be controlled. However, the processing of this embodiment can be executed even with a camera whose shooting direction is fixed. FIG. 8 is a flowchart of processing for operating the camera 111 in a case where the shooting direction is fixed. Except for the fact that input of pan and tilt control commands is excluded from step S801 and execution of pan and tilt control is excluded from step S808, this processing is identical with that shown in FIG. 3 and need not, therefore, be described again.

In this embodiment, input means corresponds to the camera operating panel 114 or camera operating unit 124, calculation means corresponds to the zoom limiting processor 113, limiting means corresponds to zoom limiting processor 113 and storage unit 115, control means corresponds to the camera pan-head controller 112, and output means corresponds to the communication interface.

Thus, in accordance with the first embodiment, as described above, it is possible to provide a camera control system which will not invade one's privacy even at a location where there is a problem in terms of privacy.

Second Embodiment

A second embodiment of the present invention will now be described in detail with reference to the accompanying drawings.

Briefly stated, the second embodiment is such that when a client looks through a camera that has been connected to a camera server, it appears just as if there are a plurality of cameras.

Figure 10:
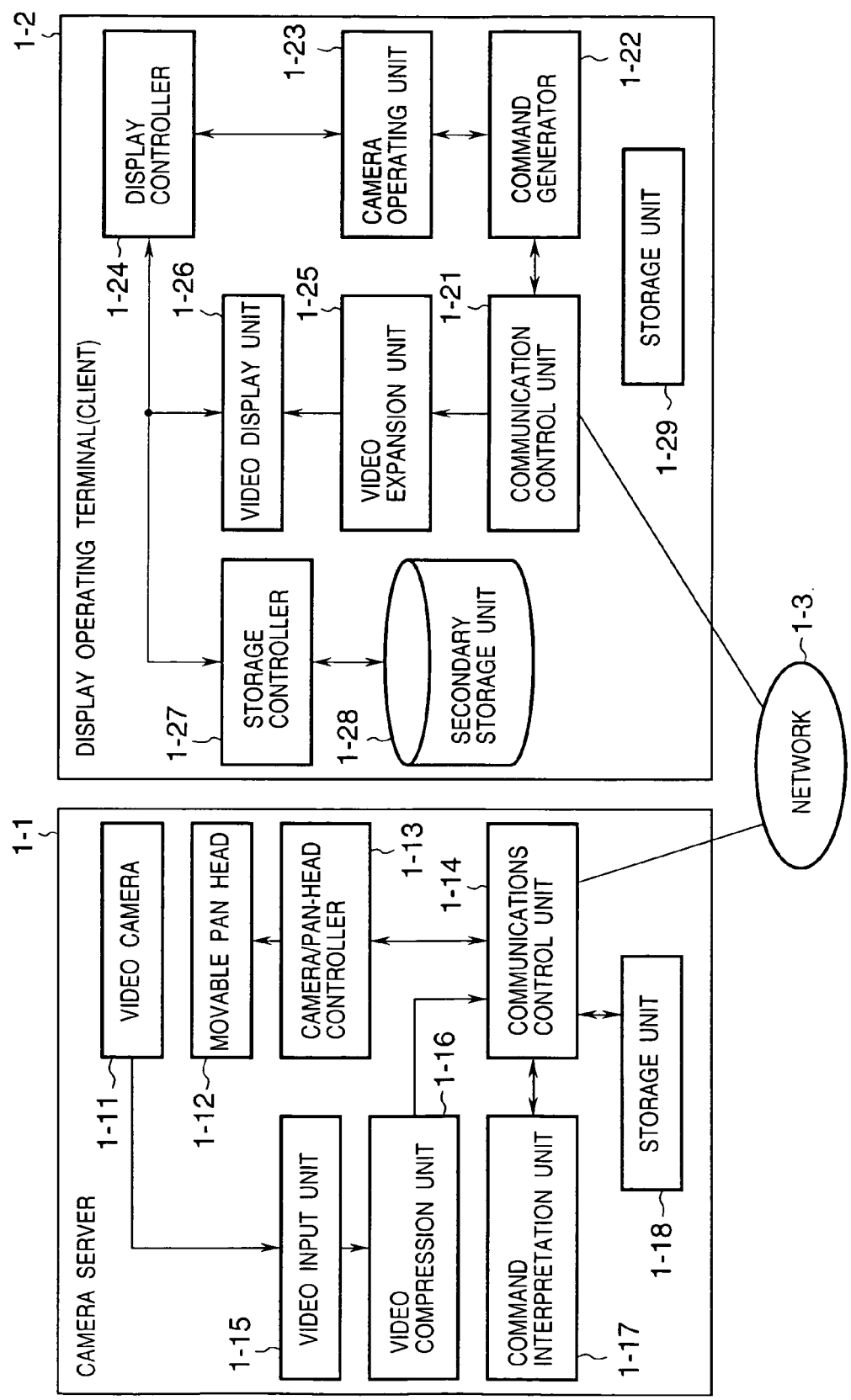
FIG. 10 is a block diagram showing a camera system according to a second embodiment of the present invention.

FIG. 10 of a system according to the second embodiment.

The system shown in FIG. 10 includes a camera server 1-1, a display control terminal (referred to as a "client") 1-2 for displaying video from the camera server 1-1 and remotely controlling a camera, and a network 1-3 for connecting the camera server 1-1 and client 1-2.

The camera server 1-1 captures video from a video camera 1-11, distributes the video to the client 1-2, accepts camera control commands from the client 1-2 and controls the zoom magnification of the video camera 1-11 and a movable pan head 1-12. (Operating the movable pan head 1-12 makes it possible to change the pan and tilt angles.)

Though one camera server 1-1 and one client 1-2 are illustrated in FIG. 10, this is for the sake of simplifying the description and there is no limitation upon the numbers thereof. The description given below also assumes one camera server and one client. As long as the network 1-3 is a digital network such as the Internet or intranet having a bandwidth sufficient for transferring a camera control signal and compressed video signal, described later, any type of network will suffice.

It is assumed that the TCP/IP (UDP/IP) protocol is the network protocol in this embodiment, and when an address is mentioned below, this is taken to indicate an IP address. Further, it is assumed that IP addresses have been assigned to the camera server 1-1 and client 1-2.

The camera server 1-1, which can be implemented by a personal computer, includes the video camera 1-11; the movable pan head 1-12 for controlling pan and tilt angles of the video camera 1-11; a camera/pan-head controller 1-13 for controlling the video camera 1-11 and the zoom magnification and pan and tilt angles of the movable pan head 1-12; a video input unit 1-15 for capturing video from the video camera 1-11; a video compression unit 1-16 for compressed captured video data; a communications control unit 1-14 for distributing compressed video data over the network; a command interpretation/execution unit 1-17 for interpreting commands from the client 1-2 via the network 1-3 and controlling the components of the camera server; and a storage unit 1-18 used in passing data among the various components.

The video input unit 1-15 captures an NTSC video signal from the video camera 1-11, converts the analog signal to a digital signal, compresses the digital signal in accordance with motion JPEG and delivers the resulting signal to the communications control unit 1-14. Though compression according to motion JPEG is used here as the video compression format, it is obvious that this does not impose a limitation and any compression format by may be employed.

The client 1-2 will not be described. As in the case of the server, the client can also be implemented by a general-purpose information processing apparatus such as a personal computer. Compressed video data distributed from the camera server 1-1 is received through a communication control unit 1-21, expanded by a video expansion unit 1-25 and displayed on a video display unit 1-26. These processes are controlled by a camera operating unit 1-23 and a command generator 1-22. It is also arranged so that camera control and operations for storing and saving images into a storage unit 1-29 and a second storage unit 1-28 through a storage controller 1-27 can be performed by operating a user interface with which the client is provided. Control for display and manipulation of screens is performed by a display controller 1-24.

Figure 11:
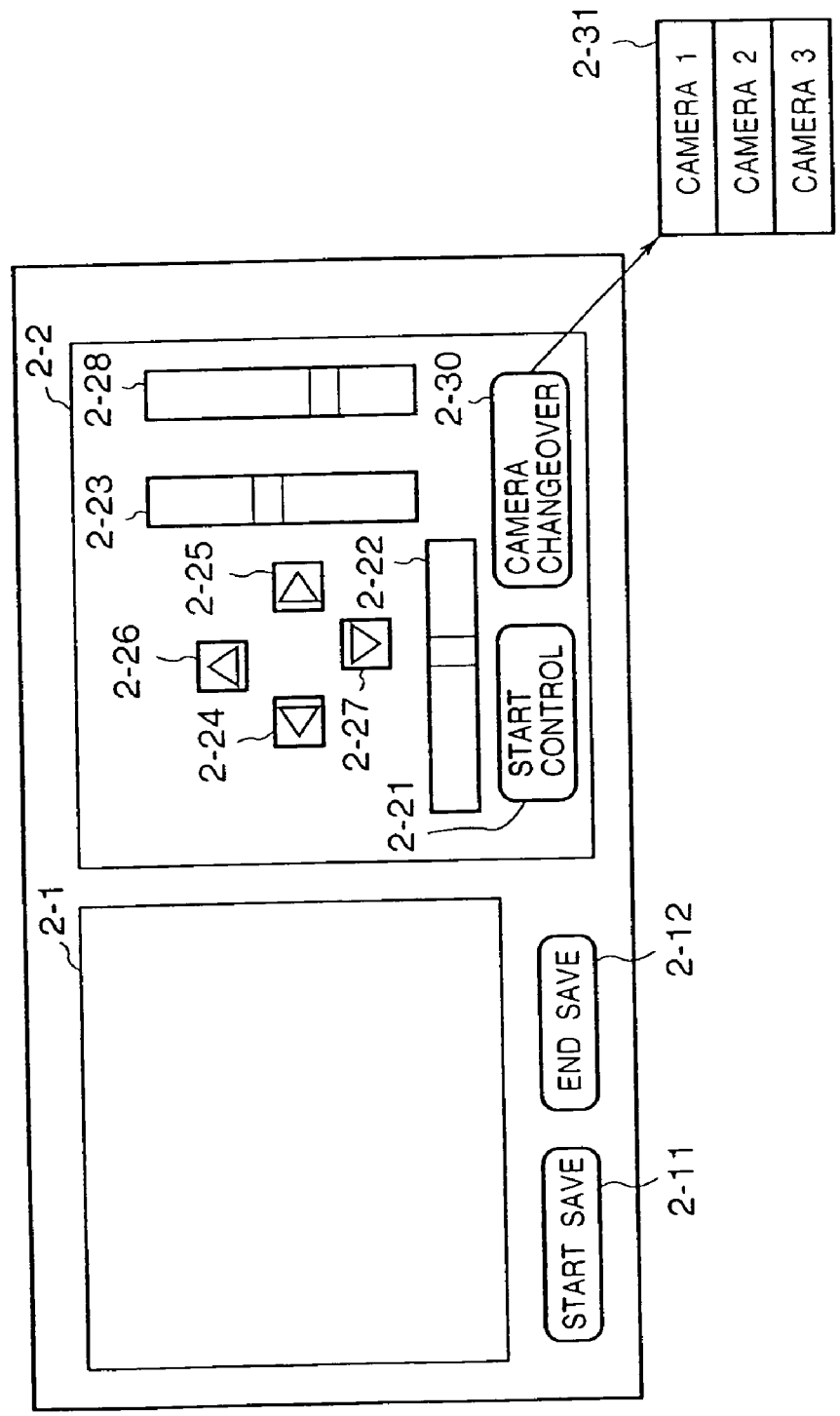
FIG. 11 is a diagram showing a user interface on the client side according to the second embodiment.

The video display unit 1-26 includes a bitmap display that is capable of constructing a screen (user interface) of the kind shown in FIG. 11. A window system is used as the video display unit 1-26 in this embodiment. Examples of this system are Microsoft's Windows 95 and the UNIX X-Window, etc.

As shown in FIG. 11, a video display area 2-1 is for displaying video, and a camera operation panel 2-2 is for operating a camera. The latter is displayed in a window format. The camera operation panel 2-2 has scroll bars 2-22, 2-23, 2-28 that make it possible to manipulate camera pan angle, tilt angle and zoom magnification. The scroll bar 2-22 for manipulating pan angle has a rectangular scroll box, which is displayed in the bar, for being moved to the left or right (generally referred to as "dragging") by a pointing device such as a mouse, whereby a command designating the pan angle is sent to the camera server. The position at which the scroll box is displayed indicates the present position in an area in which manipulation of the pan angle is limited. The scroll bar 2-23 is for manipulating tilt angle, and the scroll bar 2-28 is for manipulating zoom magnification. The method of manipulation and the meaning of the positions of the scroll boxes are similar to those of the scroll bar 2-22 for pan angle. A start save button 2-11 and a end save button 2-12 are provided to satart and end the image save operation respectively. Buttons 2-24, 2-25, 2-26, 2-27 are provided for other necessary functions.

As described earlier, users of a plurality of clients can view video from the same camera of the same camera server. In the end, however, only one client has the right to control the camera. For other clients, therefore, the scroll bars 2-22, 2-23 and 2-28 are displayed in a form to show that they are inoperable (as by displaying the scroll bars in dimmed fashion). The privilege to control the camera is acquired by using a mouse or the like to click a control start button 2-21 shown in FIG. 11. If the button 2-21 is clicked, a control-privilege acquisition request is sent to the camera server at the destination of the connection. When the request is received and another client has already been issued the control privilege, the camera server notifies the requesting client that the request is rejected. If no other client has been issued the control privilege, then the camera server issues this privilege to the requesting client. It should be noted that the camera server measures the length of time the control privilege has been granted to one client and, when a predetermined length of time expires, sends this client notification of the fact that the control privilege will be nullified.

With reference again to the user interface of FIG. 11, a camera changeover button 2-30 is for displaying a pull-down menu of the kind shown at 2-31 when the button 2-30 is clicked. In the case of the pull-down menu 2-31, any of three cameras denoted camera 1 to camera 3 can be selected. The camera names do not indicate actual cameras (the camera server in this embodiment has only one physical camera) but correspond to "virtual cameras", described below. In response to camera selection, a changeover (selection) is made among the virtual cameras. Further, it is assumed that the name of the virtual camera currently selected is displayed on the button 2-30. List information indicating selectable virtual cameras is transmitted from the camera server when this client is connected to the camera server.

A virtual camera will be described with reference to FIG. 18.

A border 9-3 indicates a range within which imaging is possible over the full range of pan and tilt angles capable of being shot by the camera 1-11 of the camera server 1-1. (This is a range in which the zoom magnification of the camera is minimum.) The areas represented by the hatching indicate areas in which shooting is allowed. In other words, the area outside these hatched areas indicates an area in which imaging is not allowed for reasons of privacy, etc.

Since the pan and tilt angles of the camera 1-11 can be changed, the user of the client would naturally think that the shooting direction (angle) of one camera could be varied over an area having a rectangular shape. In other words, it would seem odd to the user if one camera could shoot in an L-shaped area and in another area separated from it, as shown in FIG. 18. In order not to give the user such an odd impression, therefore, this embodiment is so adapted that an area in which image pick-up is possible is divided into several rectangular areas and virtual cameras are assigned to respective ones of these rectangular areas (the three areas indicated at 9-11, 9-12 and 9-13 along with a horizontal line 9-0 and a vertical line 9-1 in FIG. 18). As a result, as far as the user is concerned, it appears just as if a plurality of (three) cameras (virtual cameras) have been connected to the camera server 1-1 and just as if the angles of these cameras can be changed freely within the respective rectangular areas. The user, therefore, does not receive an odd impression. The camera names displayed in the pull-down menu 2-31 of FIG. 11 thus indicate virtual cameras.

Assume that the pan angle is represented by $\theta$ (the farther the camera is panned to the right, the greater the value of $\theta$), that the tilt angle is represented by $\phi$ (the farther the camera is panned upward, the greater the value of $\phi$), and assume that the zoom magnification is represented by z (the larger the magnification, the larger the value of z). The range within which a specific virtual camera can be controlled can be set as follows, by way of example:

θmin≦θ≦θmax (θmin: pan angle, left extreme; θmax: pan angle, right extreme);

φmin≦φ≦φmax (φmin: tilt angle, lower limit; φmax: tilt angle; upper limit);

Zmin≦Z≦Zmax (Zmin: zoom magnification, lower limit; Zmax: zoom magnification; upper limit).

Figure 18:
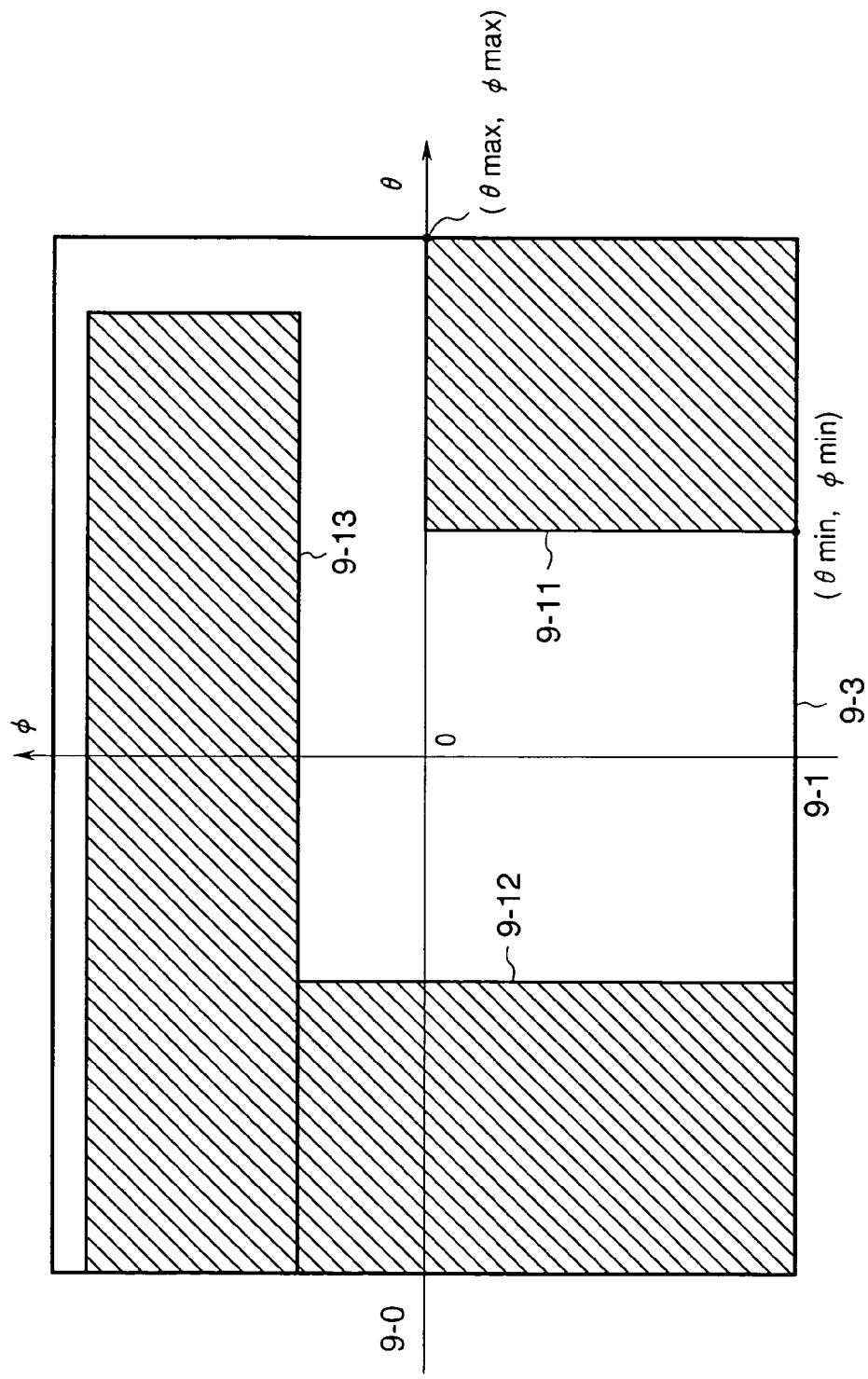
FIG. 18 is a diagram showing an example of setting of a shootable area in the second embodiment.

By way of example, if this is applied to the rectangular area 9-11 in FIG. 18, the pan and tilt control range of the virtual camera corresponding to this area will have the following diagonal coordinates: (θmin, φmin), (θmax, φmax).

Of course, (θmin, φmin), (θmax, φmax) fall within the overall physical range within which control is possible. Though the number of virtual cameras is three in this embodiment, this does not impose a limitation because, in theory, any number of virtual cameras can be set up. Further, it does not matter if the areas indicating the ranges within which virtual cameras can be controlled overlap. It is assumed that all of the virtual cameras have been assigned ID numbers for identifying these cameras. In terms of internal structure, it is assumed that a camera control-range table of the kind shown in FIG. 18 is stored in a shared memory 3-43. In addition, the number of physical cameras connected to one camera server is not limited to one; two or more physical cameras may be connected. In such case one physical camera and the table shown in FIG. 19 would be made to correspond. That is, tables of the kind shown in FIG. 19 would be provided in a number equivalent to the number of physical cameras.

Figure 12:
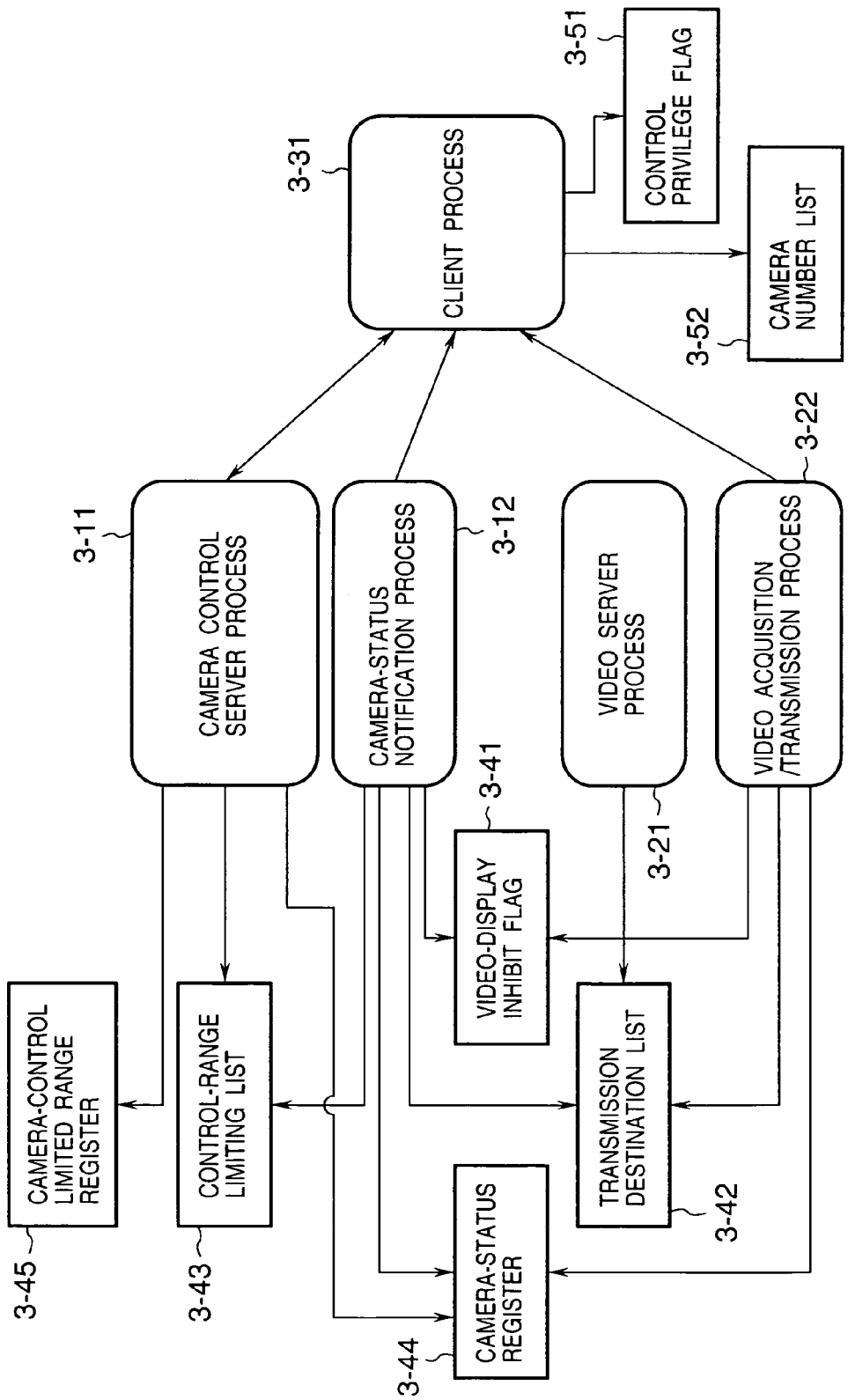
FIG. 12 is a diagram showing an operating sequence in the system according to the second embodiment.

FIG. 12 illustrates a process in accordance with the present invention. This process signifies one in a multitask operating system such as a Windows NT or UNIX operating system. It is assumed that all processes 3-11, 3-12, 3-21, 3-22 and 3-31 are operating in the steady state.

Each process that operates on the camera server 1-1 will now be described.

Camera control server process 3-11: This process executes control for accepting a camera control command, which has been issued by a client process 3-31 having the control privilege, and outputting the command to the camera/pan-head controller 1-13.

Camera-status notification process 3-12: This process senses the states of pan and tilt angles of a camera and notifies the client process 3-31.

Video server process 3-21: This process manages the destination of camera video transmission.

Video acquisition/transmission process 3-22: This process captures and transmits camera video.

It should be noted that a video-display inhibit flag 3-41, a transmission destination list 3-42, a camera control-range limiting list 3-43 and a camera-status register 3-44 have been provided in a shared memory used in passing data between processes. Further, a camera-control limited range register 3-45, a control privilege flag 3-51 and a camera number list 3-52 are registers for temporarily saving data used in the processes.

Figure 13:
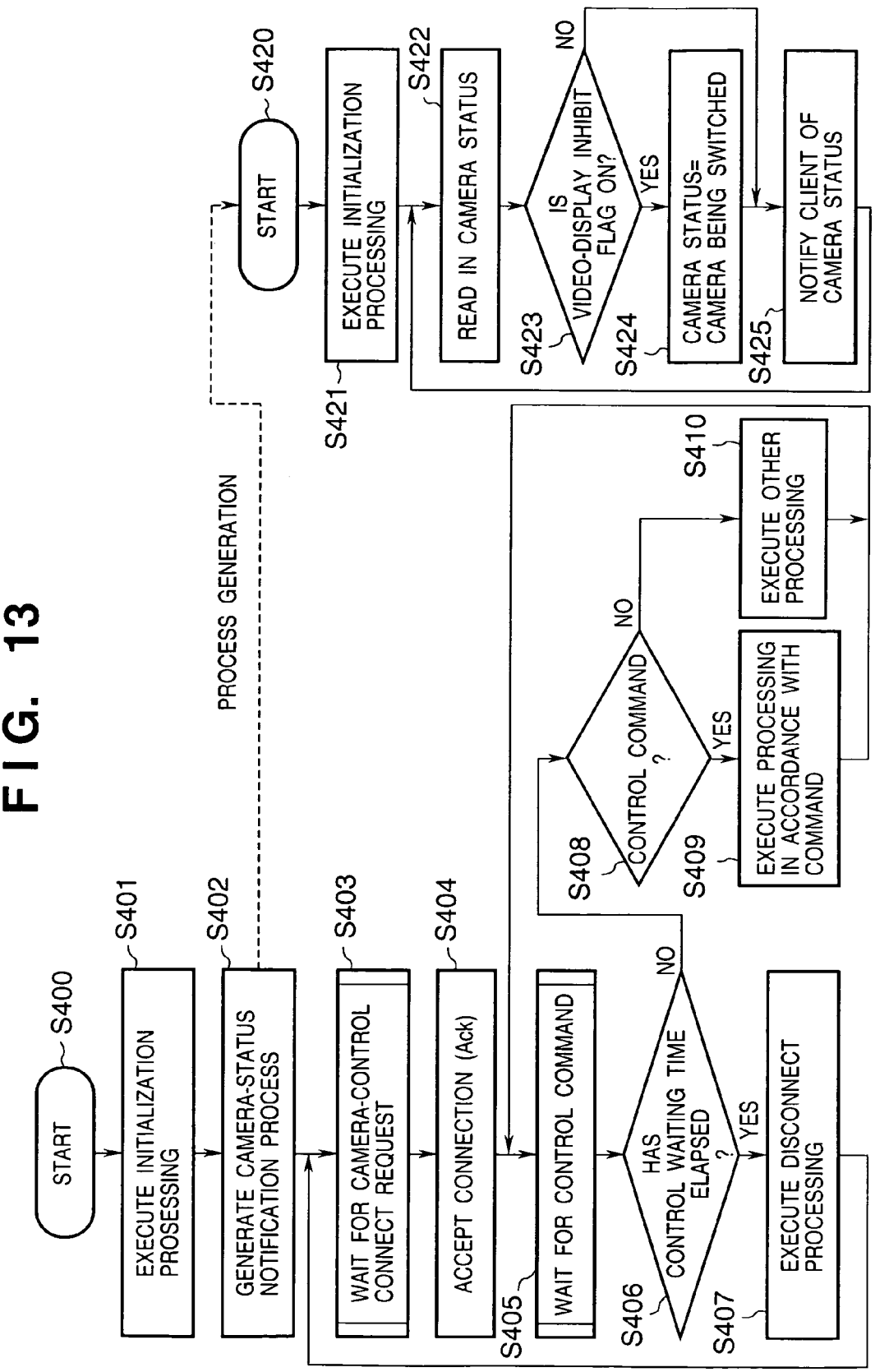
FIG. 13 is a flowchart showing the operation of a camera service according to the second embodiment.
Figure 14:
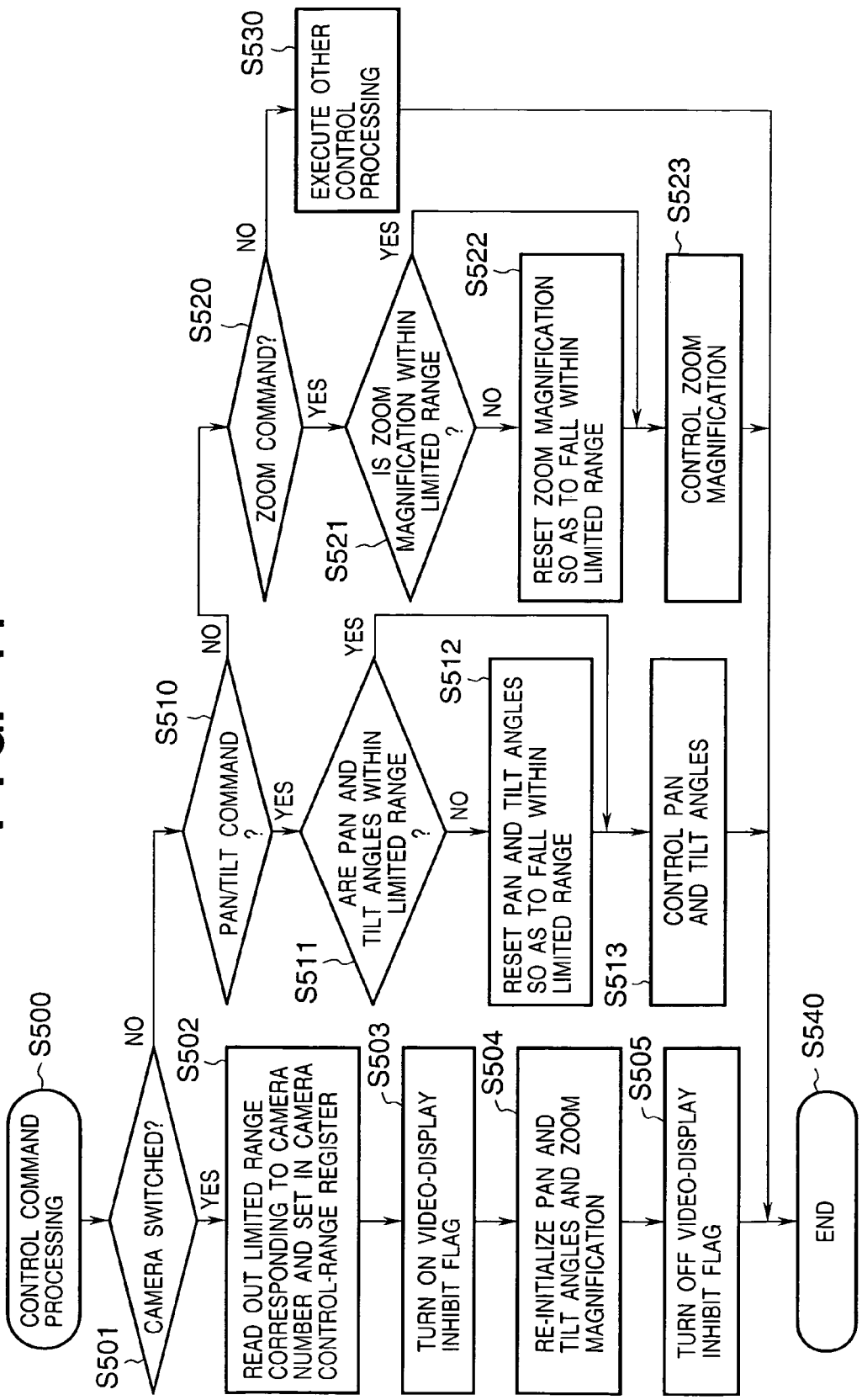
FIG. 14 is a flowchart showing the operation of a camera service according to the second embodiment.
Figure 15:
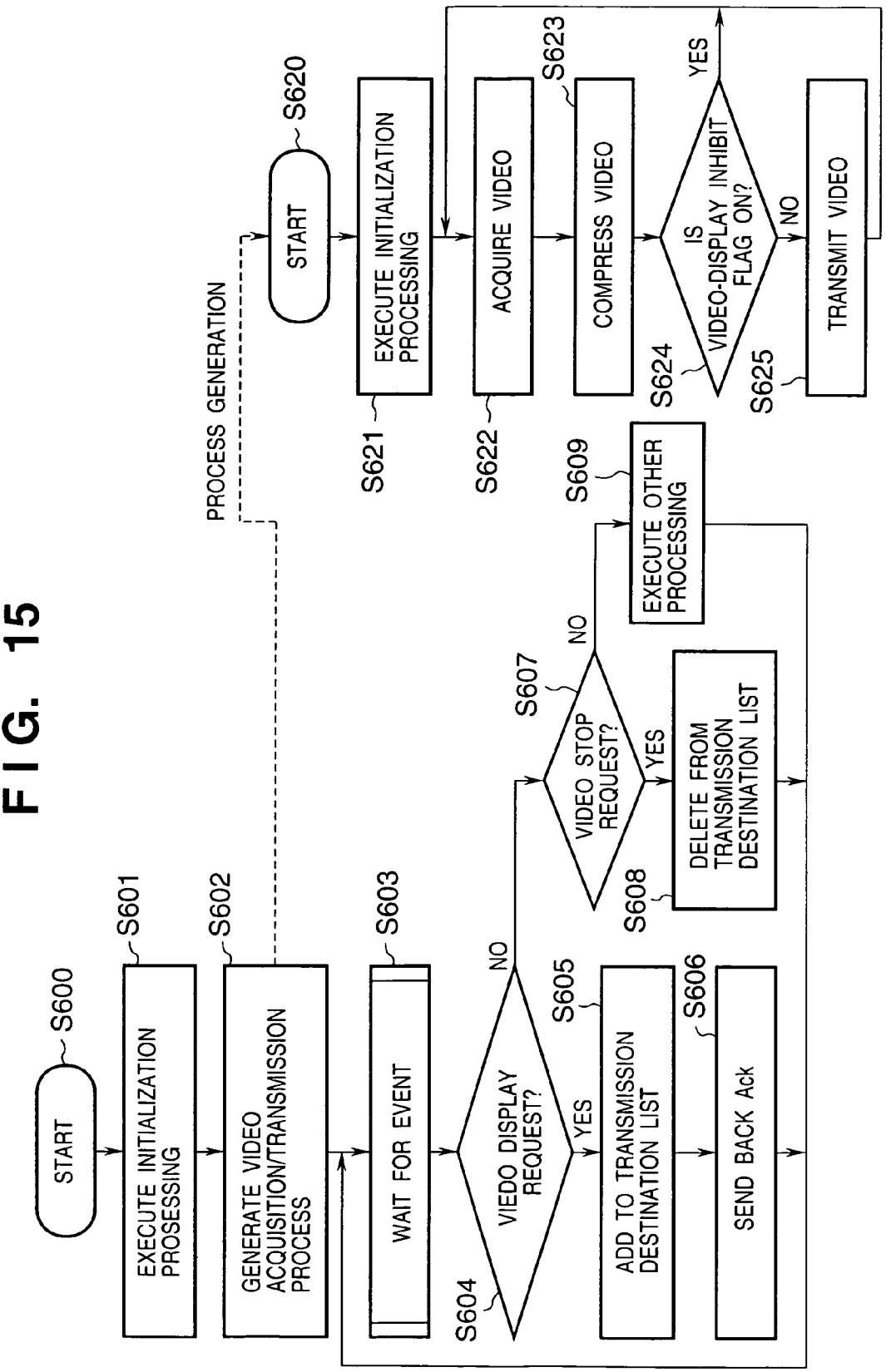
FIG. 15 is a flowchart showing the operation of a camera service according to the second embodiment.
Figure 16:
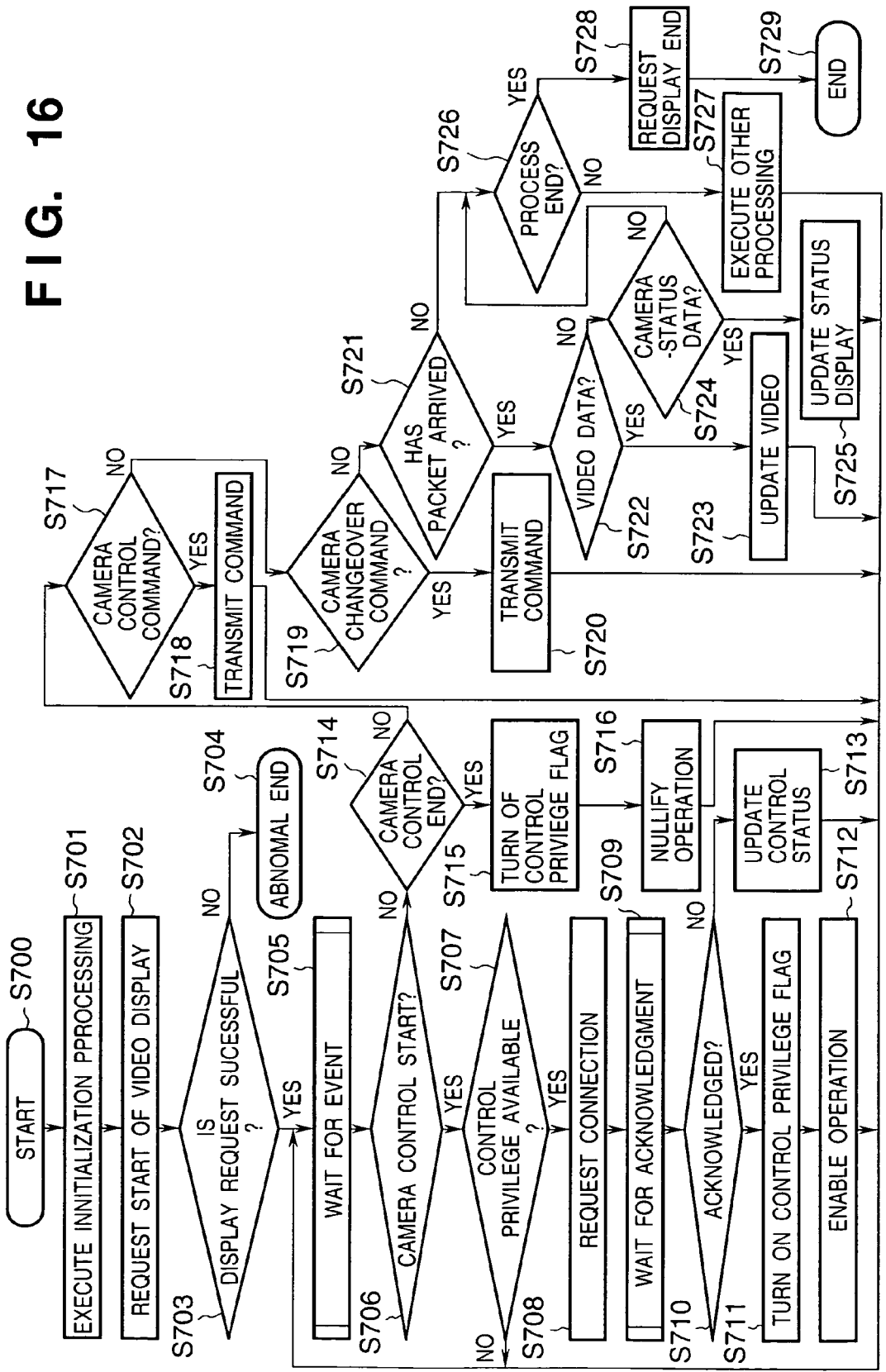
FIG. 16 is a flowchart showing the operation of a client according to the second embodiment.

The details of the operation of processes 3-11 to 3-22 in the camera server 1-1 are illustrated in the flowcharts of FIGS. 13, 14 and 15. The client process 3-31 runs on the camera client 1-2, and the details of this operation are illustrated in the flowchart of FIG. 16. It should be noted that the programs corresponding to these flowcharts have been stored in a storage device (e.g., a hard disk or the like) possessed by the server or client and are loaded to a main memory (main RAM) in order to be executed.

First the processes of the camera server will be described with reference to the flowcharts of FIGS. 13 to 15.

Figure 17:
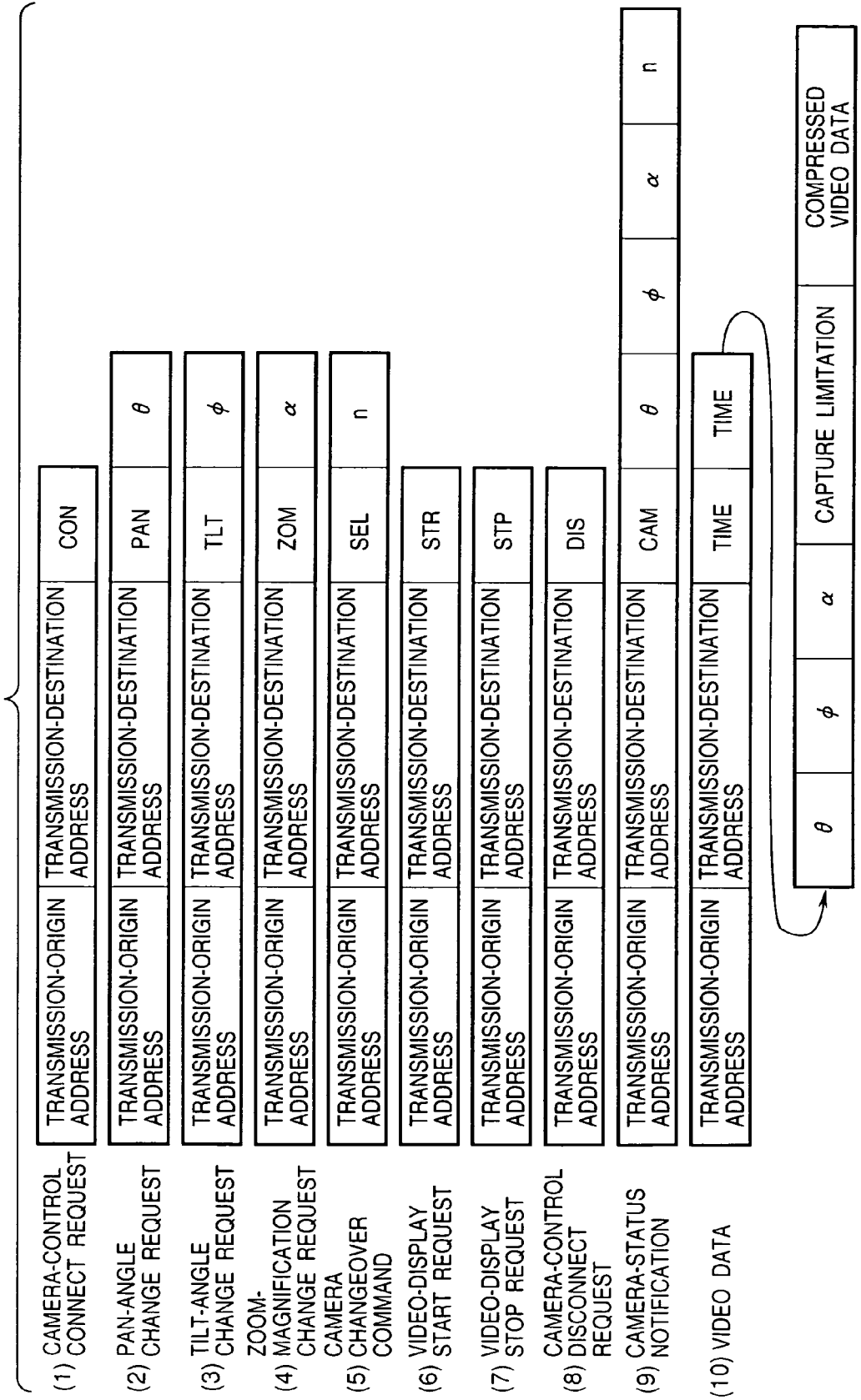
FIG. 17 is a diagram showing the format of each command in the second embodiment.

It should be noted that packets having a format of the kind shown in FIG. 17 are generated and transmitted to the network 1-3. (Strictly speaking, use is made of a format employed in TCP/IP or UDP/IP packets, etc. In FIG. 17, however, only packet information necessary for describing this embodiment is shown.)

The camera control process and camera-status notification processing will be described using the flowchart of FIG. 13.

When the camera control server process 3-11 is started up (step S400), after executing initialization processing (step 401), the camera-status notification process 3-12 is generated (step S402) and a camera-control connect request [(1) in FIG. 17] from the client process 3-31 is awaited (step S403). When there is a connect request from the client process 3-31, connect acceptance processing (for sending back Ack) is executed (step S404) and camera control commands [(2) to (4) in FIG. 17] sent from the connected client process 3-31 are awaited (step S405). In connect acceptance processing, the client is notified of the list information concerning the virtual cameras possessed by the camera server, as described earlier. That is, the list information is transferred to the client. At this time a timer is set. At step S406, it is determined that whether control waiting time has elapsed a predetermined time period. If a certain fixed time (referred to as "control waiting time") elapses, the camera control connection is severed (step S407). If however the control waiting time has not elapsed the predetermined time period, the process advances to step S408 where it is determined that whether there is received a control command.

If it is determined at step S408 that camera control commands [(2) to (4) in FIG. 17] are received, the camera/pan-head controller 1-13 controls the zoom magnification of the video camera 1-11 and the pan and tilt angles of the movable pan head 1-12 in accordance with these commands (step S409). Until control waiting time elapses, camera control commands are accepted from the client process 3-31 and camera control conforming to the commands is performed through the command interpretation/execution unit 1-17 and camera/pan-head controller 1-13. The details of processing conforming to control commands are illustrated in FIG. 14. In order to simplify the description, it is assumed that the camera control commands are as follows:

| | |
|---|---|
| pan-angle change command | PAN θ |
| tilt-angle change command | TIL φ |
| zoom-magnification change command | ZOM α |

If, however, it is determined at step S408 that there is no control command is received, other processing is executed (step 410).

It should be noted that θ, φ, α are parameters representing pan angle, tilt angle and zoom magnification, respectively. Though various settings of values for a backlighting correction, autofocus and manual focus are possible, these are not described here.

The following command [(5) in FIG. 17] for changing over virtual cameras also is available:

camera changeover command SEL n (where n indicates the identification number of a virtual camera).

Upon starting a control command processing (step S500), it is determined at step S501 that whether a camera is switched (step S501). When a camera changeover request command is issued, a control range corresponding to the identification number of a virtual camera is read out of the camera control-range limiting list 3-43 and set in the camera-control limited range register 3-45 and camera-status register 3-44 (step S502). Next, after turning on video-display inhibit flag (step 503), pan, tilt and zoom values calculated in the next procedure are initialized as the initial position of the virtual camera (step S504). The initially set values of the virtual camera are values at the center of the limited range in regard to the pan and tilt angles and minimum magnification of the limited range in regard to the zoom magnification. However, it is permissible to decide the pan and tilt angles and the zoom magnification of the limited range in advance and then set the pan and tilt angles and the zoom magnification to these values. The flow then advances to step S505 to turn off video-display inhibit flag ending the process (step S540).

If it is determined at step S501 that the camera is not switched, the flow advances to step S510 where it is determined that whether the pan/tilt command is received. If it is determined at step S510 that the pan/tilt command is received, the flow advances to step S511 where it is determined that whether pan and tilt angles are within a limited range. If it is determined at S511 that the pan and tilt angles are not within the limited range, the pan and tilt angles are reset so as to these values fall within the limited range (S512). After the resetting (S512) the pan and tilt angles are controlled at step S513.

If it is determined at step S510 that the pan/tilt command is not received, the flow advances to step S520 where it is determined whether zoom command is received. If it is determined at step S520 that the zoom command is received, it is determined whether zoom magnification is within limited range (S521). If it is determined at step S521 that the zoom magnification is not within the limited range, the zoom magnification is reset so as to fall within the limited range (S522) and then the zoom magnification is controlled (S523). If it is determined at step S521 that the zoom magnification is within the limited range, the flow advances to step S523. If it is determined at step S520 that the zoom command is not received, the flow advances to step S530 where other control processing is executed.

There is a possibility that an area in which a video transmission is not allowed will be traversed during a changeover of virtual cameras, namely during a change in camera panning, tilting and zooming. The video-display inhibit flag is set (turned ON), therefore, so that video will not be transmitted at such time (step S503). When the video-display inhibit flag is ON, "−1" information is reported to each client as the identification number of the virtual camera, as will be described later. Thus, in a case where the selected virtual camera is in the state that has been set at step S502 (regarding pan angle, tilt angle and zoom magnification), the video-display inhibit flag is turned off. As a result, processing for distributing video can be executed again.

In the case of a pan/tilt or zoom request command, on the other hand, it is determined whether the pan angle, tilt angle and zoom magnification fall within the control range of the virtual camera (steps S511, S521). In a case where a value is outside the range, the value is reset to the upper limit (in case of a value that is too large) or lower limit (in case of a value that is too small) of the control range. Camera control is then carried out.

If a fixed period of time elapses from the start of the connection for camera control and control waiting time expires, disconnect processing (step S407) is executed.

During the processing of step S407, a camera-control disconnect command [(8) in FIG. 17], i.e., a command which takes away the camera control privilege, is sent back to the client process 3-31. Arrival of a connect request is again awaited (step S403). The camera control server process 3-11 accepts a camera-control connect request from any client process similarly implemented and operates the camera but, as will be understood from FIG. 13, a plurality of client processes cannot be connected simultaneously. Accordingly, it is assumed that this connection is connection oriented, as in the manner of TCP/IP.

The status of the camera is checked continuously while the camera-status notification process 3-12 generated at step S402 is operating. That is, upon starting the status checking process (step S420), an initialization processing is executed (S421), and camera pan and tilt angles and zoom magnification (=p, t, z) are read in by making an inquiry of the camera/pan-head controller 1-13, these are written to the camera-status register 3-44 (step S422) and the status of the video-display inhibit flag 3-41 is checked (step S423). If the flag is ON, it is construed that the camera status is "CAMERA BEING SWITCHED" (virtual-camera identification number n=−1) (step S424) and the client process 1-2 that is transmitting video is notified of the camera status [format of (9) in FIG. 17] (step S425).

The video server process and video acquisition/transmission process will now be described with reference to the flowchart of FIG. 15.

When the video server process 3-21 is started up (step S600), after executing initialization process (step S601), the video acquisition/transmission process 3-22 is generated (step S602) and an event from the video server process 3-21 is awaited (step S603). If the event is a video-display start request command [(6) in FIG. 17] (step S604), then the packet transmission-source address contained in the video-display request packet is checked and added to the video transmission destination list 3-42 (step S605). If the event is a video-display stop request command (step S606) [(6) in FIG. 17], then, in similar fashion, the packet transmission-source address contained in the video-display request packet is checked and deleted from the transmission destination list 3-42. It should be noted that the address of the video-transmission destination is retained in the video transmission destination list 3-42 in a list format. If, however, it is determined at step S604 that the even is not a video-display request, the flow advances to step S607 where it is determined that whether it is a video stop request. If it is the video stop request, the request is deleted from transmission destination list at step S608. If it is determined at step S607 that it is not the video stop request, other process is executed at step S609.

When the video acquisition/transmission process 3-22 is started up, the following operation is repeated: upon starting (S620) and executing initialization processing (S621), the camera video is captured as a frame (step S622) and compression is carried out (step S623). If the video-display inhibit flag is ON (step S624), the compressed video data is converted to the packet formation shown at (10) in FIG. 17 and is transmitted to the plurality of addresses in the video transmission destination list 3-42 (step S625).

The client process 3-31, which operates on the client side, will now be described in accordance with the flowchart of FIG. 16.

When this process is started up (S700), initialization processing is executed (step 5701) and a video-display start request is transmitted to the camera server corresponding to the address (IP address, here assumed to be "ADDR_C") of the connected camera server 1-1 (step S702). The packet format at this time is as indicated at (6) in FIG. 17.

If Ack is not sent back from the camera server that corresponds to ADDR_C (step S703), this means that operation is abnormal, e.g., that the address is erroneous. The client process, therefore, is terminated (step S704).

If Ack is sent back, then the display is successful (step S703) and the client process waits for an event, i.e., a user input from the user interface or reception of various packets from the camera server 1-1 (step S705).

If the user clicks the control start button 2-21 (step S706), the user verifies, based upon the control privilege flag 3-51 (a variable reserved in the RAM possessed by the client), whether the prevailing state is one in which camera control has already started (step S707). If camera control is already in progress, processing returns to step 5705. If control is not in progress, then the camera-control connect request [(1) in FIG. 17] is sent to the camera control server process (step S708) and acknowledgment (Ack) is awaited (step S709). If it is determined at step S710, Ack is sent back, a connection is established with respect to the camera control server process, the control privilege flag 3-51 in the storage unit 1-29 of the client apparatus is turned ON (step S711) and operation at the camera operation panel 2-2 (the buttons for changing shooting direction and the scroll bars) is enabled (S712). It should be noted that the camera control server process accepts a connect request only at the time of step S403 for camera-control connect request standby. If it is determined at step S710 that Ack is not sent back, the flow advances to step S713 updating the control status.

If the connection is established and control waiting time elapses, the camera-control disconnect command [(8) in FIG. 17] is sent back from the camera control server process. When this is accepted (step S714), the control privilege flag 3-51 is turned OFF (step S715) to nullify operation at the camera operation panel 2-2 (step S716).

During the time that operation at the camera operation panel 2-2 is enabled, a camera control command that corresponds to the operation performed at the camera operation panel 2-2 is generated and sent to the client 1-2 (steps S717–S718). In a case where a camera has been selected from the camera-changeover pull-down menu 2-31 of the camera operation panel 2-2, a camera changeover command [(5) in FIG. 17] is issued (steps S719–S720). It should be noted that the process through which commands are generated is not shown.

In response to a client-process terminate request (step S726) issued by operation using the menu or the like, the camera-control disconnect command [(8) in FIG. 17] is issued (step S728) and the client process is terminated (step S729). If, however, the client-process terminate request is not issued, other processing is executed (step S727).

If, in a case where a packet has arrived (step S721), the packet is video data [(10) in FIG. 17] (step S722), compressed video data contained in this video data is read out and subjected to expansion processing, after which the displayed video on the video display panel 2-1 is updated using this video frame data (step S723).

In a case where the arriving packet is for camera-status notification [(9) in FIG. 17] (step S724), the display positions of the scroll boxes in the scroll bars 2-22, 2-23, 2-28 for manipulating the pan and tilt angles and zoom magnification are changed to the corresponding positions using parameters contained in the packet updating the status display (step S725). Further, the camera name corresponding to the identification number of the virtual camera is displayed on the camera changeover button 2-30. (In a case where another client process is remotely controlling the camera, this information is updated.) The association between the identification number of the virtual camera and the camera name makes use of the corresponding relationship of which notification has been given by the camera-status notification process 3-12. It should be noted that when the identification number of the virtual camera is −1 (i.e., when the camera is currently moving within the shootable range of the virtual camera), it is construed that the operation for changing over the virtual camera is currently being carried out and a message to this effect is displayed on the video display panel 2-1.

In accordance with the second embodiment, the result of the above-described operation is that, when viewed from the client, one physical camera possessed by a camera server appears just as if it were a plurality of cameras (virtual cameras). Moreover, if at least the pan and tilt angles of each individual virtual camera are within a rectangularly shaped zone, they can be changed at will. Consequently, it does not matter that the user of the client is unaware that an area in which imaging is limited because of privacy-related reasons exists within this zone. In addition, the user is not given an odd impression.

As described earlier, it is also possible to provide one camera server with a plurality of physical cameras. In this case also it would suffice to set up a plurality of virtual cameras for each individual physical camera. It would then be so arranged that the camera server give the control privilege to the client independently on a per-physical-camera basis.

In the case of the administrator of the client server, the administrator would operate the camera server directly to edit the camera-control limiting list. However, an arrangement may be adopted in which the administrator is connected in the same manner as the client, notifies the camera server of the fact that he or she is the administrator (e.g., as by giving an ID or password) and transfers the file of the limiting list to the camera server by a protocol such as ftp.

Alternatively, in the case of the administrator, an arrangement may be adopted in which the border of a range within which the pan and tilt angles of a physical camera can be changed is displayed on a screen and, using a pointing device such as a mouse, the administrator sets several rectangles within this border to thereby set virtual cameras corresponding to these rectangular areas as well as pan and tilt angles over which these virtual cameras can be moved. The administrator may set upper and lower limit values of zoom magnification in regard to set rectangular areas using a keyboard or mouse, etc., and processing according to the first embodiment described earlier may then be executed. Of course, in an instance where the administrator has logged in on the client side in order to accomplish this, a program for providing the administrator with the above-described control need only be run.

Figure 20:
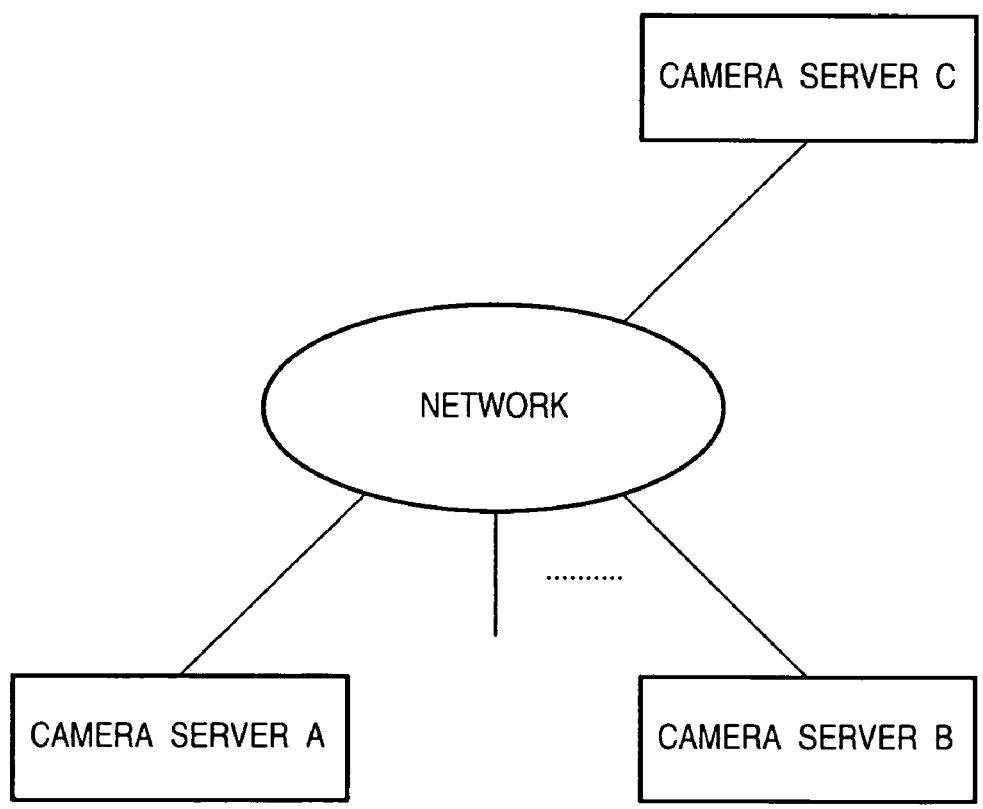
FIG. 20 is a diagram showing the configuration of a system according to a modification of the second embodiment.

Next, a situation in which a camera server having a plurality of control limiting areas (a plurality of virtual cameras) and a camera server for which no particular restrictions have been set are connected to a network in mixed fashion will be described with reference to FIG. 20.

Figure 21:
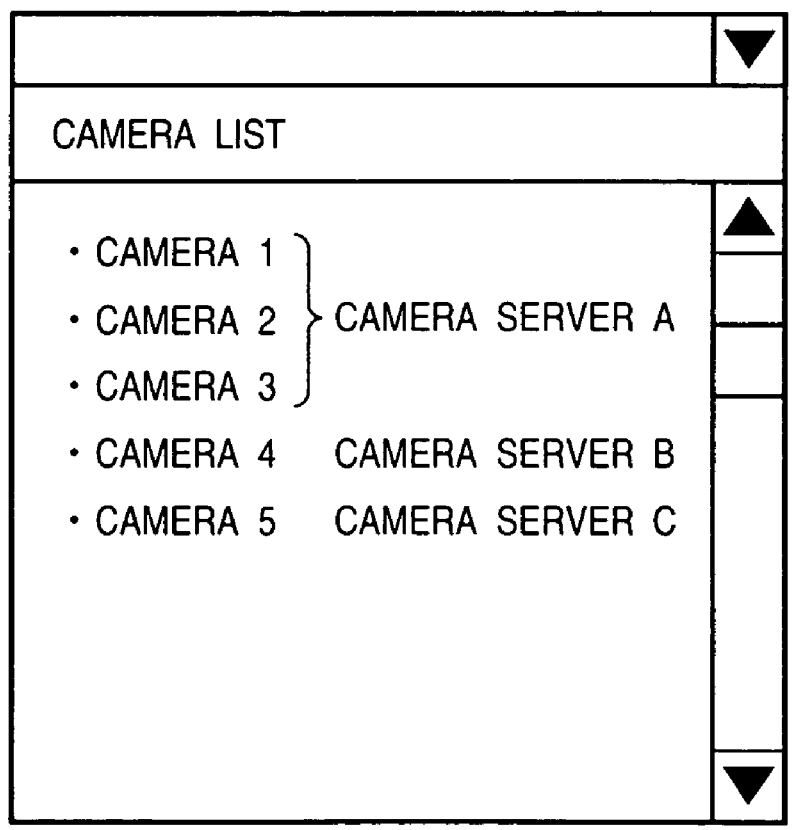
FIG. 21 is a diagram showing a camera list in the system of FIG. 20.

In a situation where a plurality of camera servers exist, desirably a user utilizing a client server is presented with a list of the camera servers (e.g., a list of the kind shown in FIG. 21 is displayed) and employs a pointing device such as a mouse to select from the list the camera server he or she wishes to see.

When a camera server is selected by the user, the camera client transmits the video-display start request, as at step S702 in FIG. 16. If the present invention is utilized, a plurality of control limiting areas can be handled as separate, independent cameras in the same manner as another camera server. For example, in the user interface shown in FIG. 21, cameras 1 to 3 correspond to respective ones of control limiting areas of one and the same camera server, and cameras 4 and 5 are separate camera servers.

The present embodiment is characterized by the following:

1) A camera server is provided with means for managing a plurality of camera control limiting areas, namely areas (referred to as "control limiting areas") in which the range of camera pan and tilt angles and zoom magnification is limited;
2) the individual limiting areas are limited in control range by setting left and right extremes of pan angles, upper and lower limits of tilt angles and upper and lower limits of zoom magnification;
3) it appears to the client process as if each control limiting area is a separate, independent virtual camera; and
4) in a case where a plurality of control limiting areas are switched among, it appears to the client process as if a plurality of cameras are being switched among.

As a result of the above, it is possible to set camera-control limiting ranges more realistically and flexibly for areas involving privacy-related problems. In other words, camera-control limiting areas are set simply one at a time. A plurality of such control limiting areas can be set based on the concept of a plurality of virtual cameras. The person setting a camera control range, therefore, need only set the control limiting ranges as different cameras. From the standpoint of the client process, these areas seem to be separate cameras having different control limiting ranges. This makes it easy to grasp the limiting ranges.

According to the first and second embodiments, the camera server requires hardware, namely image sensing means and means for connecting it to a network. However, this can be realized by a general-purpose information processing apparatus such as a personal computer. Further, as the client merely lacks the image sensing means, the basic hardware thereof is the same as that of the camera server and it, too, can be constructed using a general-purpose information processing apparatus such as a personal computer.

In other words, it will suffice if the necessary hardware is exploited and a program for operating the apparatus as a camera server or client is provided. Accordingly, the object of the invention is attained by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function expansion board inserted into the computer or in a memory provided in a function extension unit connected to the computer, a CPU or the like contained in the function expansion board or function expansion unit performs a part of or the entire process in accordance with the designation of program codes and implements the function of the above embodiments.

Although a camera has been mentioned as an example of the image sensing means in the foregoing embodiments, this does not impose a limitation, for a device such as a flat-bed scanner may also be used as such means.

Thus, in accordance with the second embodiment of the present invention, as described above, it is possible to provide an excellent operating environment, without giving a client an odd impression, while setting a plurality of scattered imaging control areas within a range in which imaging can be performed by image sensing means whose shooting direction can be changed.

As many apparently widely different embodiments of the present invention can be made without departing from the spirit and scope thereof, it is to be understood that the invention is not limited to the specific embodiments thereof except as defined in the appended claims.

What is claimed is:

1. An image pick-up server, which has camera, for performing a distribution service which distributes video information obtained by the camera to a client via a network, comprising:

a storage device adapted to set a plurality of shootable areas, which are the object of the distribution service, within a range in which shooting direction of said camera can be changed, and to store information relating to the plurality of shootable areas set and information which specifics a plurality of virtual cameras for respective ones of the shootable areas;

a notifying device adapted to notify the client of the identification information of plurality of virtual cameras stored by said storage device;

a receiving device adapted to receive a selection command from the client selecting one of the plurality of virtual cameras corresponding to the identification information notified by said notifying device; and a control device adapted to read out, from said storage device, information corresponding to virtual camera selected by the client, after receiving the selection command from the client, to set a range in which it is possible to change the shooting direction of said camera based upon the information relating to the shootable area indicated by the information that has been read out, and to control said camera within the range in which it is possible to change the shooting direction.

2. The server according to claim 1, wherein said storage device stores, with respect to said plurality of shootable areas, identification numbers of respective ones of said virtual camera, and information indicating ranges of pan and tilt angles of said camera.

3. The server according to claim 2, wherein said storage device stores information indicating ranges over which zoom magnification can be changed with respect to said plurality of shootable areas.

4. The server according to claim 1, wherein said control device includes a inhibiting device adapted to inhibit distribution of video information, which has been obtained by said camera, during changing of the shooting direction of said camera in order to change over the virtual camera.

5. The server according to claim 1, wherein information relating to the shootable areas is stored in the server.

6. A client connected to the image pick-up server set forth in claim 1, comprising:
   a selection notification device adapted to select one of said virtual camera that have been stored in said storage device and notifying said image pick-up server of the information specifying the selected virtual camera;
   a display device adapted to display an image distributed by said image pick-up server; and
   a shooting-direction change designation device adapted to change the shooting direction of the virtual camera selected by said selection notification device and instructing said server of result of the change.

7. The client according to claim 6, wherein the information relating to the shootable areas is downloaded from said image pick-up server.

8. An image pick-up system comprising an image pick-up server, which has a camera, for performing a distribution service which distributes video information obtained by said camera to a client via a network, and a client for receiving the video information from said image pick-up server, wherein said image pick-up server includes:
   a storage device adapted to set a plurality of shootable areas, which are the object of the distribution service, within a range in which shooting direction of said camera can be changed, and to store information relating to the plurality of shootable areas set and information which specifies a plurality of virtual camera for respective ones of the shootable areas;
   a notifying device adapted to notify the client of the identification information of plurality of virtual cameras stored by said storage device;
   a receiving device adapted to receive a selection command from the client selecting one of the plurality of virtual cameras corresponding to the identification information notified by said notifying device; and
   a control device adapted to read out, from said storage device, information corresponding to virtual camera selected by the client, after receiving the selection command from the client, to set a range in which it is possible to change the shooting direction of said device based upon the information relating to the shootable area indicated by the information that has been read out, and to control said camera within the range in which it is possible to change the shooting direction; and
   said client includes:
   selection notification device adapted to select one of said virtual cameras that have been stored in said storage device and to notify said image pick-up server of the information specifying the selected virtual camera;
   a display device adapted to display an image distributed by said image pick-up server; and
   a shooting-direction change designation device adapted to change the shooting direction of the virtual camera selected by said selection notification device and to instruct said server of result of the change.

9. A method of controlling an image pick-up server, which has a camera, for performing a distribution service which distributes video information obtained by said camera to a client via a network, said method comprising:
   a storage step of setting a plurality of shootable areas, which are the object of the distribution service, within a range in which shooting direction of said camera can be changed, and storing, in a storage device, information relating to the plurality of shootable areas set and information which specifies a plurality of virtual camera for respective ones of the shootable areas;
   a notifying step of notifying the client of the identification information of plurality of virtual cameras stored in said storage step;
   a receiving step of receiving a selection command from the client selecting one of the plurality of virtual cameras corresponding to the identification information notified in said notifying step; and
   a control step of reading out, from said storage device, information corresponding to a virtual camera selected by the client after receiving the selection command from the client, setting a range in which it is possible to change the shooting direction of said camera based upon the information relating to the shootable area indicated by the information that has been read out, and controlling said camera within the range in which it is possible to change the shooting direction.

10. A storage medium storing program code which, by being read in and executed by a computer, functions as an image pick-up server, which has a camera, for performing a distribution service which distributes video information obtained by said camera to a client via a network, said storage medium storing program code which functions as:
    a storage step of setting a plurality of shootable areas, which are the object of the distribution service, within a range in which shooting direction of said camera can be changed, and storing, in a storage device information relating to the plurality of shootable areas set and information which specifies a plurality of virtual cameras for respective ones of the shootable areas;
    a notifying step of notifying the client of the identification information of plurality of virtual cameras stored in said storage step;
    a receiving step of receiving a selection command from the client selecting one of the plurality of virtual cameras corresponding to the identification information notified in said notifying step; and
    a control step of reading out, from said storage device, information corresponding to a virtual camera selected by the client after receiving the selection command from the client setting a range in which it is possible to change the shooting direction of said camera based upon the information relating to the shootable area indicated by the information that has been read out, and controlling said camera within the range in which it is possible to change the shooting direction.

11. An image pick-up server for distributing image information obtained by a camera to a client via a network, comprising:
    storage device for storing a plurality of control ranges, which are the objects of the distribution, within an entire range in which the camera is sensible, and storing identification information which specifies a plurality of virtual cameras for respective ones of the control ranges
    a notifying device for notifying the client of the identification information of plurality of virtual cameras stored by said storage device;
    a receiving device for receiving a selection command from the client selecting one of the plurality of virtual cameras corresponding to the identification information notified by said notifying device; and
    a control device for controlling said camera within the control range corresponding to the identification information of the virtual camera selected by the client after receiving the selection command from the client.

12. The image pick-up server according to claim 11, wherein each of control ranges is defined by variable range of at least one of pan, tilt, and zoom of said image sensing apparatus.

13. The image pick-up server according to claim 11, wherein said control device controls said image sensing apparatus in accordance with a control command from the client, and when the control command exceeds the control range, said control device resets the control command to be within the control range.

14. The image pick-up server according to claim 11, further comprising a changing device for changing the virtual camera in accordance with the selection information received from the client.

15. The image pick-up server according to claim 14, wherein distribution of image information to the client is inhibited during changing the virtual camera by said changing device.

16. An image pick-up server for distributing image information obtained by a camera to a client via a network, comprising:
   a storage device for storing a plurality of control ranges, which are the objects of the distribution, within an entire range in which the camera is sensible, and storing identification information which specifies a plurality of virtual cameras for respective ones of the control ranges;
   a notifying device for notifying the client of the identification information of plurality of virtual cameras stored by said storage device;
   a receiving device for receiving a selection command from the client selecting one of the plurality of virtual cameras corresponding to the identification information notified by said notifying device; and
   a distributing device for distributing image information within the control range corresponding to the identification information of the virtual camera selected by the client after receiving the selection command from the client.

17. The image pick-up server according to claim 16, wherein each of control range is defined by variable range of at least one of pan, tilt, and zoom of said image sensing apparatus.

18. The image pick-up server according to claim 16, wherein said distributing device distributes the image information in accordance with a control command from the client, and when the control command exceeds the control range, said distributing device resets the control command to be within the control range.

19. The image pick-up server according to claim 16, further comprising a changing device for changing the virtual camera in accordance with the selection information received from the client.

20. The image pick-up server according to claim 19, wherein said distributing device does not distribute image information to the client during changing the virtual camera by said changing device.

21. A method of controlling an image pick-up server for distributing image information obtained by a camera to a client via a network, said method comprising:
   a storage step of storing a plurality of control ranges, which are the objects of the distribution, within an entire range in which the camera is sensible, and storing identification information which specifies a plurality of virtual cameras for respective ones of the control ranges;
   a notifying step of notifying the client of the identification information of plurality of virtual cameras stored in said storage step;
   a receiving step of receiving a selection command from the client selecting one of the plurality of virtual cameras corresponding to the identification information notified in said notifying step; and
   a control step of controlling said camera within the control range corresponding to the identification information of the virtual camera selected by the client after receiving the selection command from the client.

22. A method of distributing image information obtained by a camera from an image pick-up server to a client via a network, said method comprising:
   a storing step of storing a plurality of control ranges, which are the objects of the distribution, within an entire range in which the camera is sensible, and storing identification information which specifies a plurality of virtual cameras for respective ones of the control ranges; a notifying step of notifying the client of the identification information of plurality of virtual cameras stored in said storage step;
   a receiving step of receiving a selection command from the client selecting one of the plurality of virtual cameras corresponding to the identification information notified in said notifying step; and
   a distributing step of distributing image information within the control range corresponding to the identification information of the virtual camera selected by the client after receiving the selection command from the client.

23. A storage medium storing program code which, by being read in and executed by a computer, functions as an image pick-up server for distributing image information obtained by a camera to a client via a network, said storage medium storing program code which functions as:
   a storage step of storing a plurality of control ranges, which are the objects of the distribution, within an entire range in which the camera is sensible, and storing identification information which specifies a plurality of virtual cameras for respective ones of the control ranges;
   a notifying step of notifying the client of the identification information of plurality of virtual cameras stored in said storage step;
   a receiving step of receiving a selection command from the client selecting one of the plurality of virtual cameras corresponding to the identification information notified in said notifying step; and
   a control step of controlling said camera within the control range corresponding to the identification information of the virtual camera selected by the client after receiving the selection command from the client.

24. A storage medium storing program code which, by being read in and executed by a computer, functions as an image pick-up server for distributing image information obtained by a camera to a client via a network, said storage medium storing program code which functions as:
   a storing step of storing a plurality of control ranges, which are the objects of the distribution, within an entire range in which the camera is sensible, and storing identification information which specifies a plurality of virtual cameras for respective ones of the control ranges;

a notifying step of notifying the client of the identification information of plurality of virtual cameras stored in said storage step;

a receiving step of receiving a selection command from the client selecting one of the plurality of virtual cameras corresponding to the identification information notified in said notifying step; and a distributing step of distributing image information within the control range corresponding to the identification information of the virtual camera selected by the client after receiving the selection command from the client.

* * * * *

UNITED STATES PATENT AND TRADEMARK OFFICE
CERTIFICATE OF CORRECTION

PATENT NO. : 6,985,178 B1
DATED : January 10, 2006
INVENTOR(S) : Kenji Morita and Tomoaki Kawai It is certified that error appears in the above-identified patent and that said Letters Patent is hereby corrected as shown below:

<u>Column 18,</u>
Line 29, replace "has camera" with -- has a camera --; and
Line 38, replace "specifics" with -- specifies --.

Signed and Sealed this

Twenty-eighth Day of March, 2006

JON W. DUDAS
*Director of the United States Patent and Trademark Office*